H. A. W. WOOD.
MACHINE FOR MAKING MAGAZINES AND THE LIKE.
APPLICATION FILED SEPT. 7, 1910.
1,232,639.
Patented July 10, 1917.
17 SHEETS—SHEET 6.
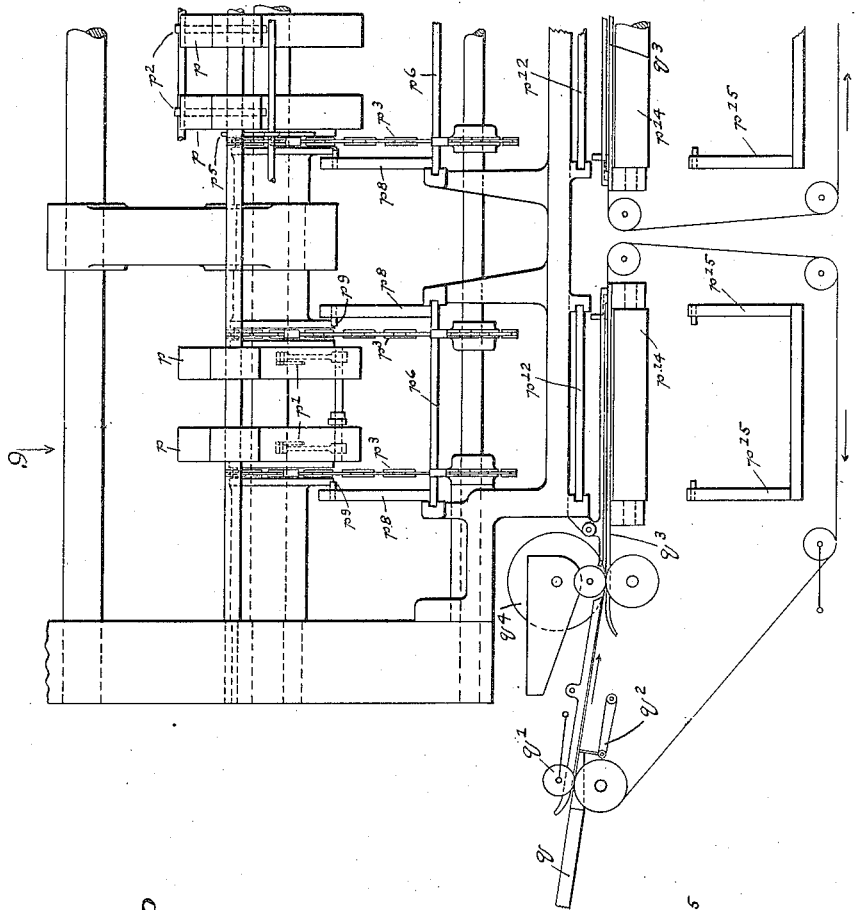
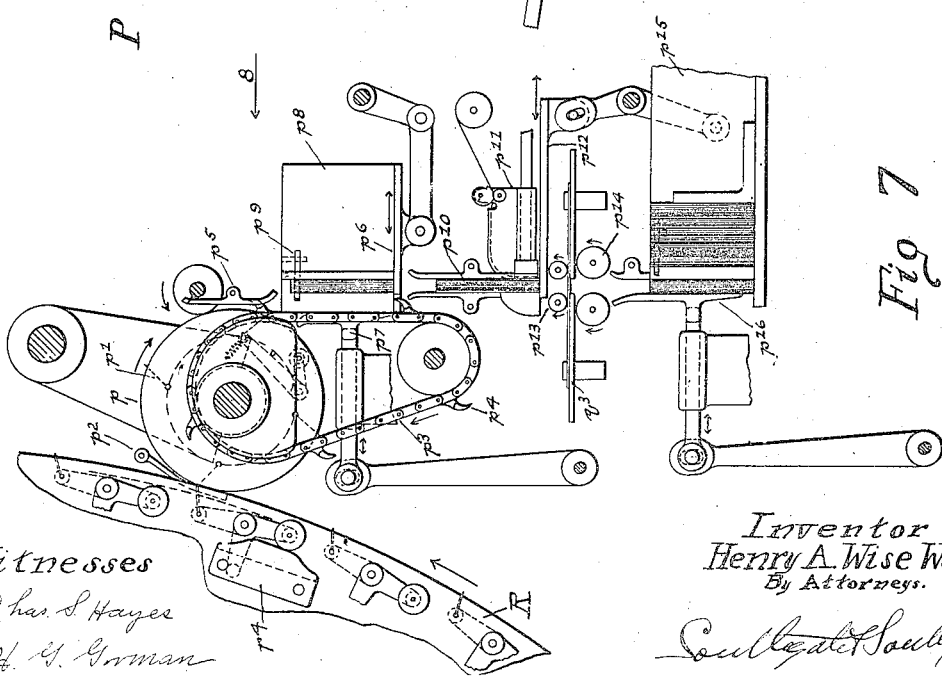
Witnesses
Chas. S. Hayes
H. S. Gorman
Inventor
Henry A. Wise Wood
By Attorneys.
Southgate & Southgate

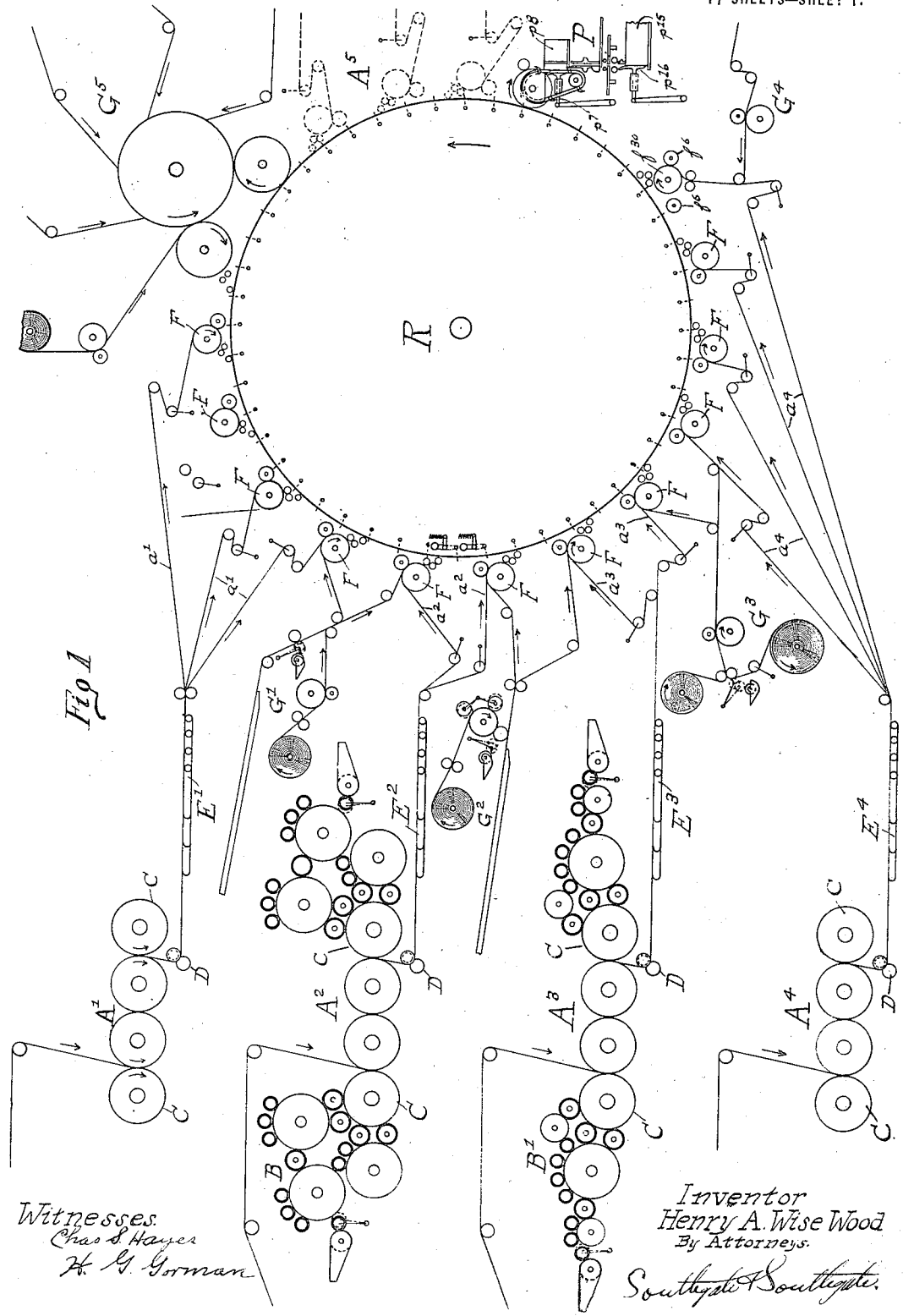

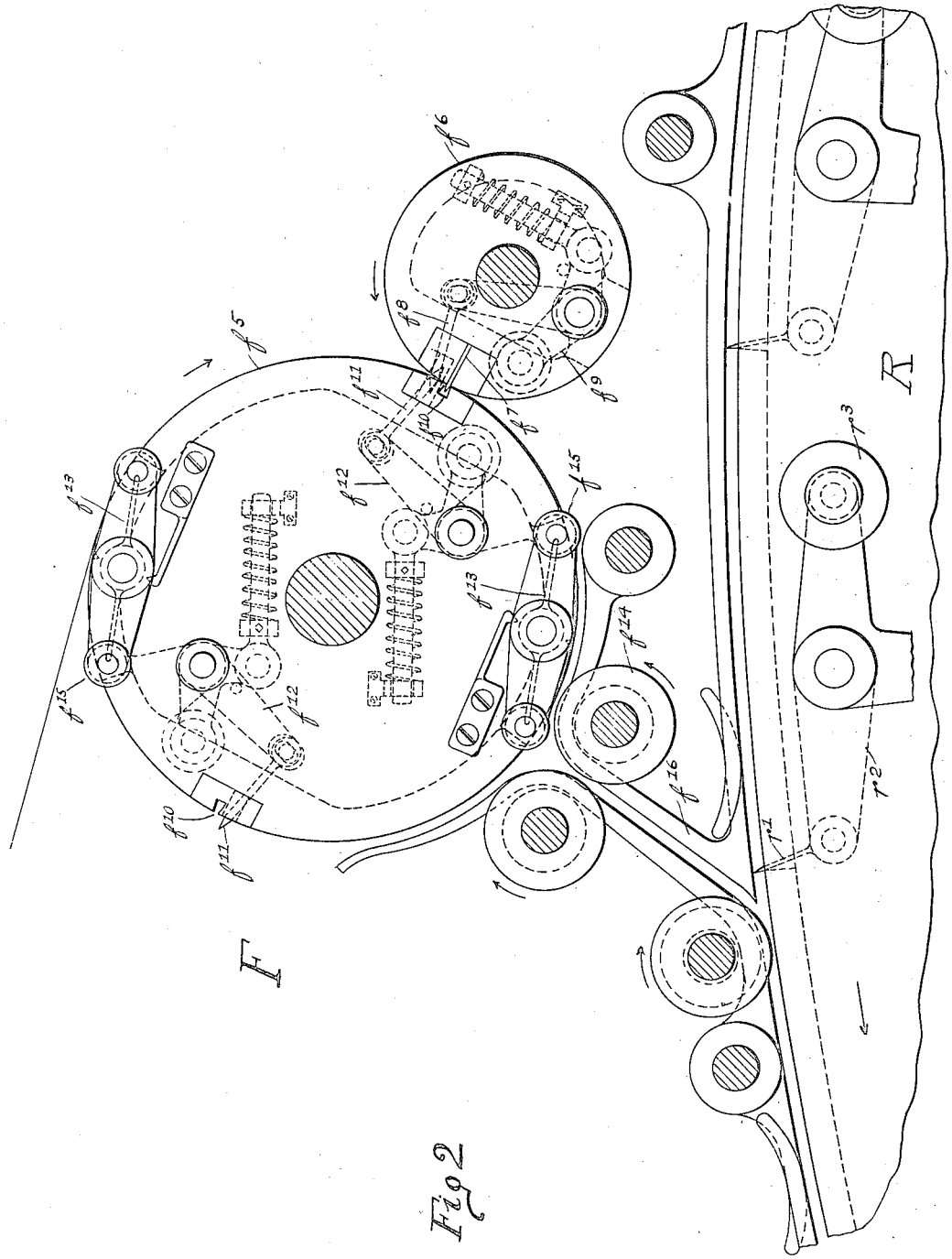

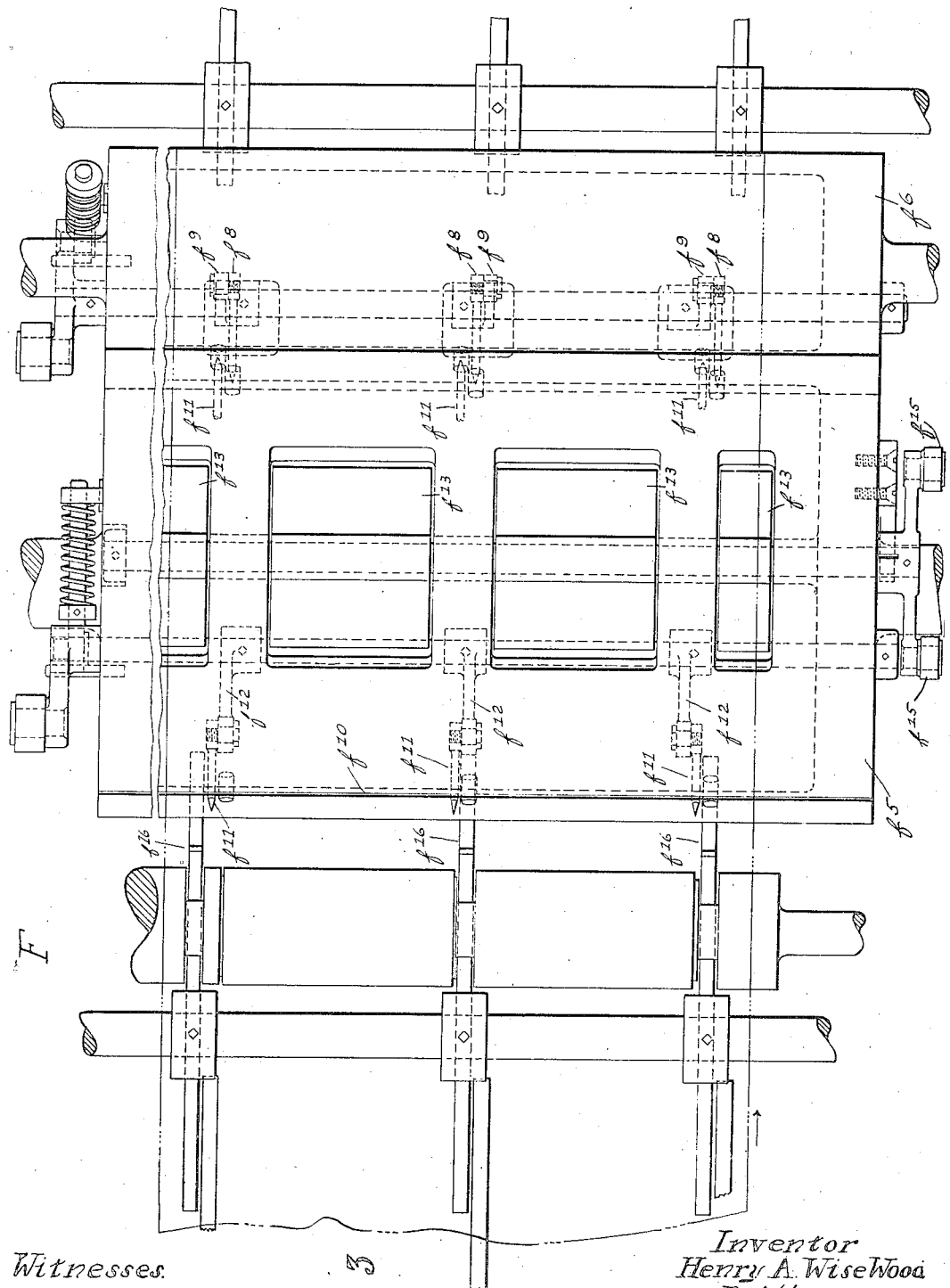

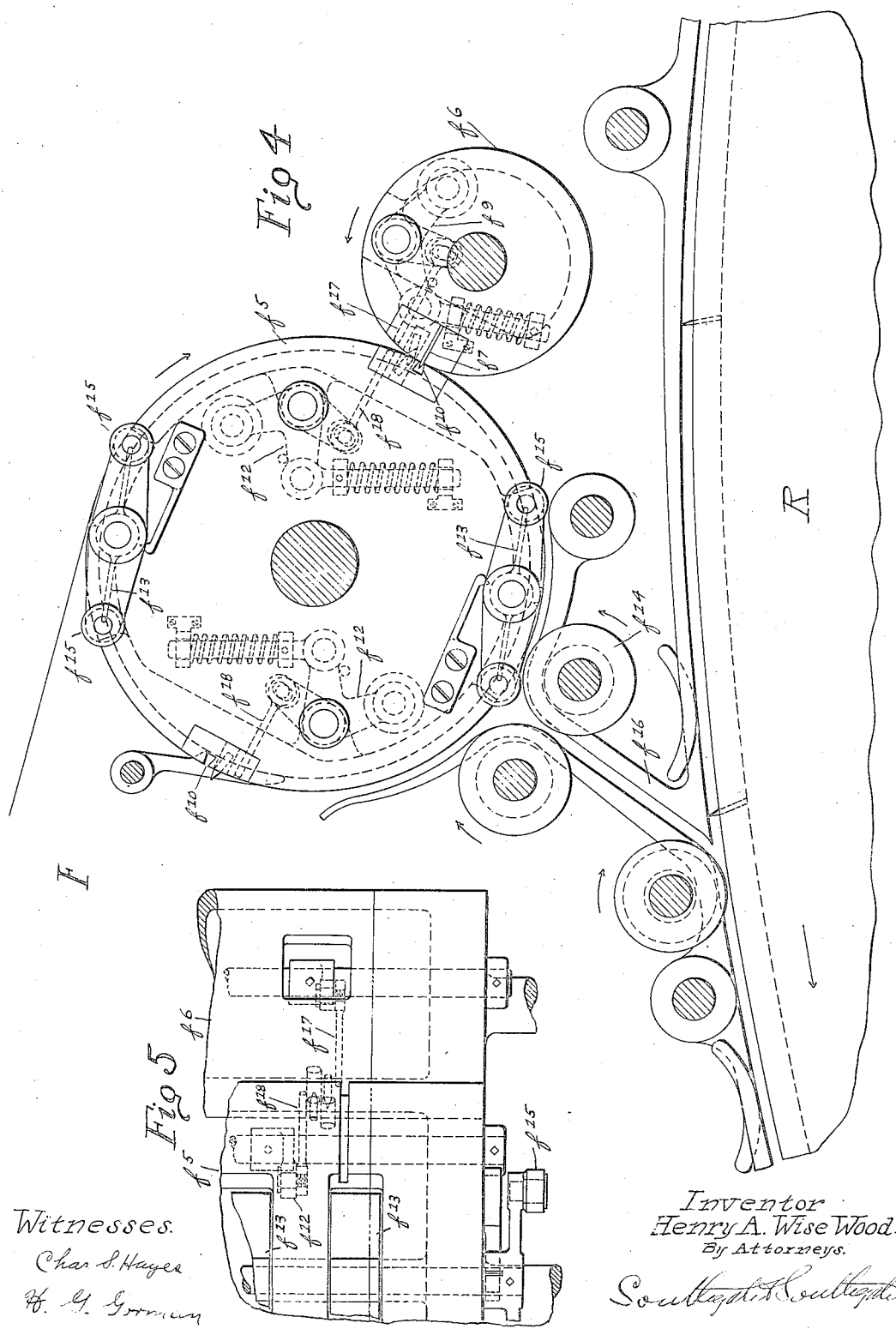

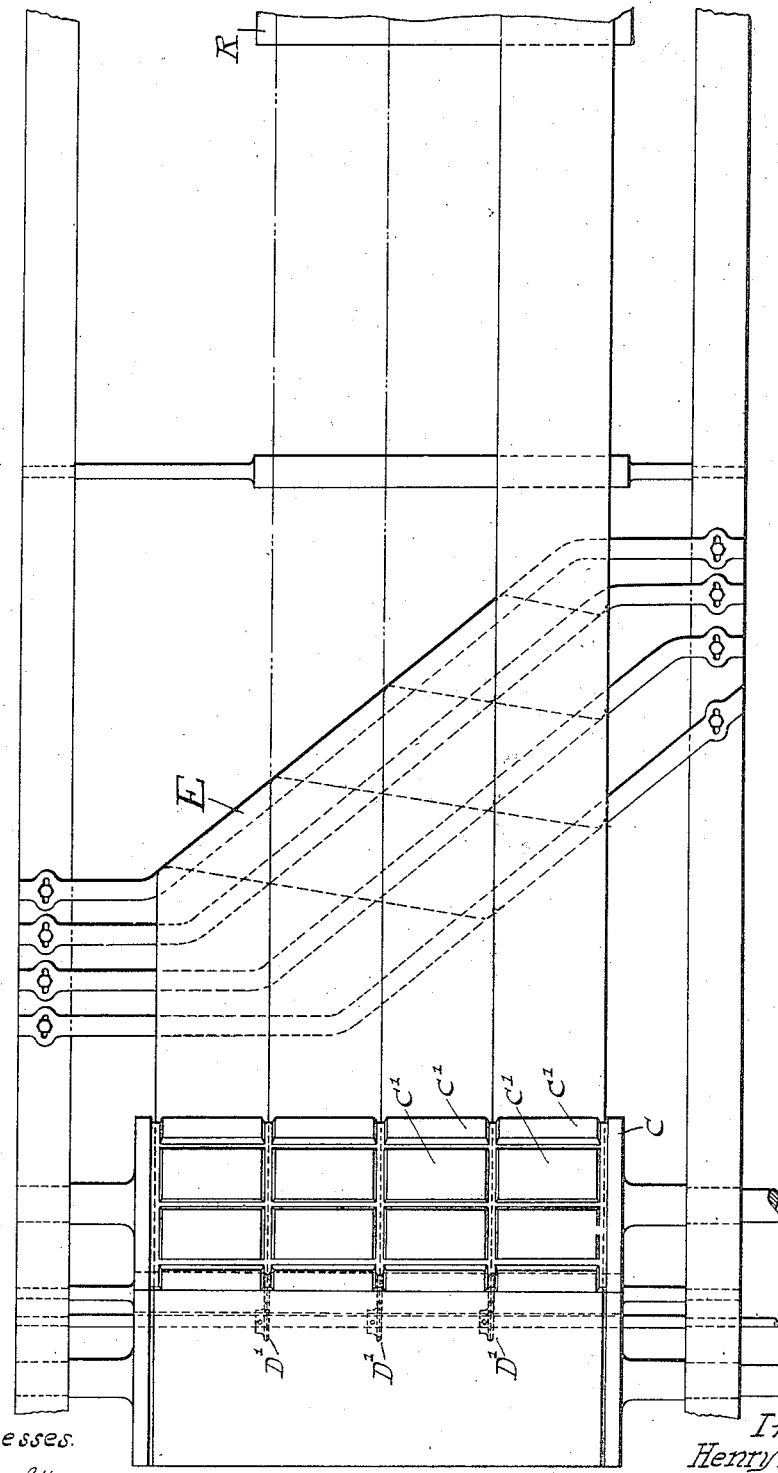

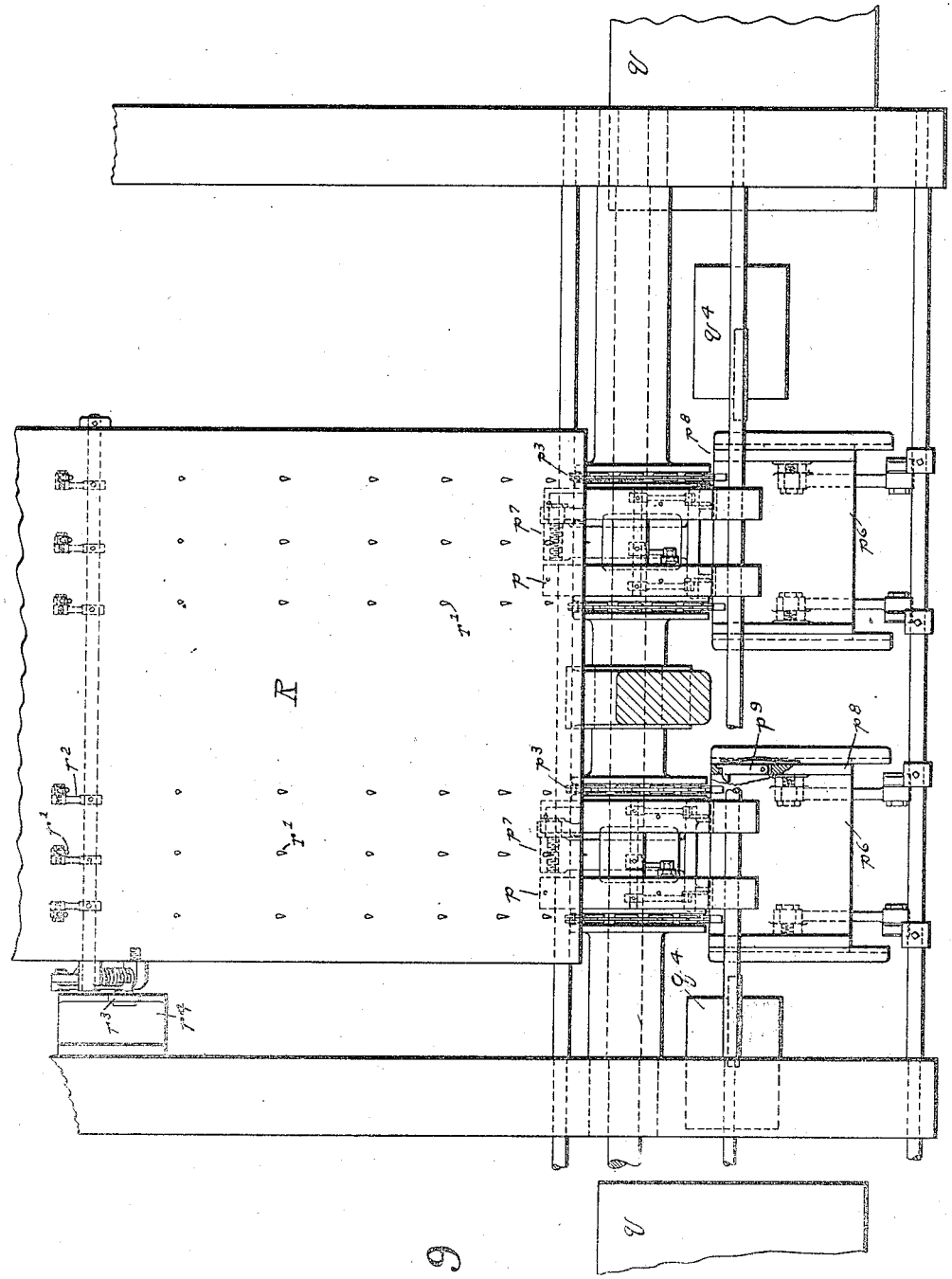

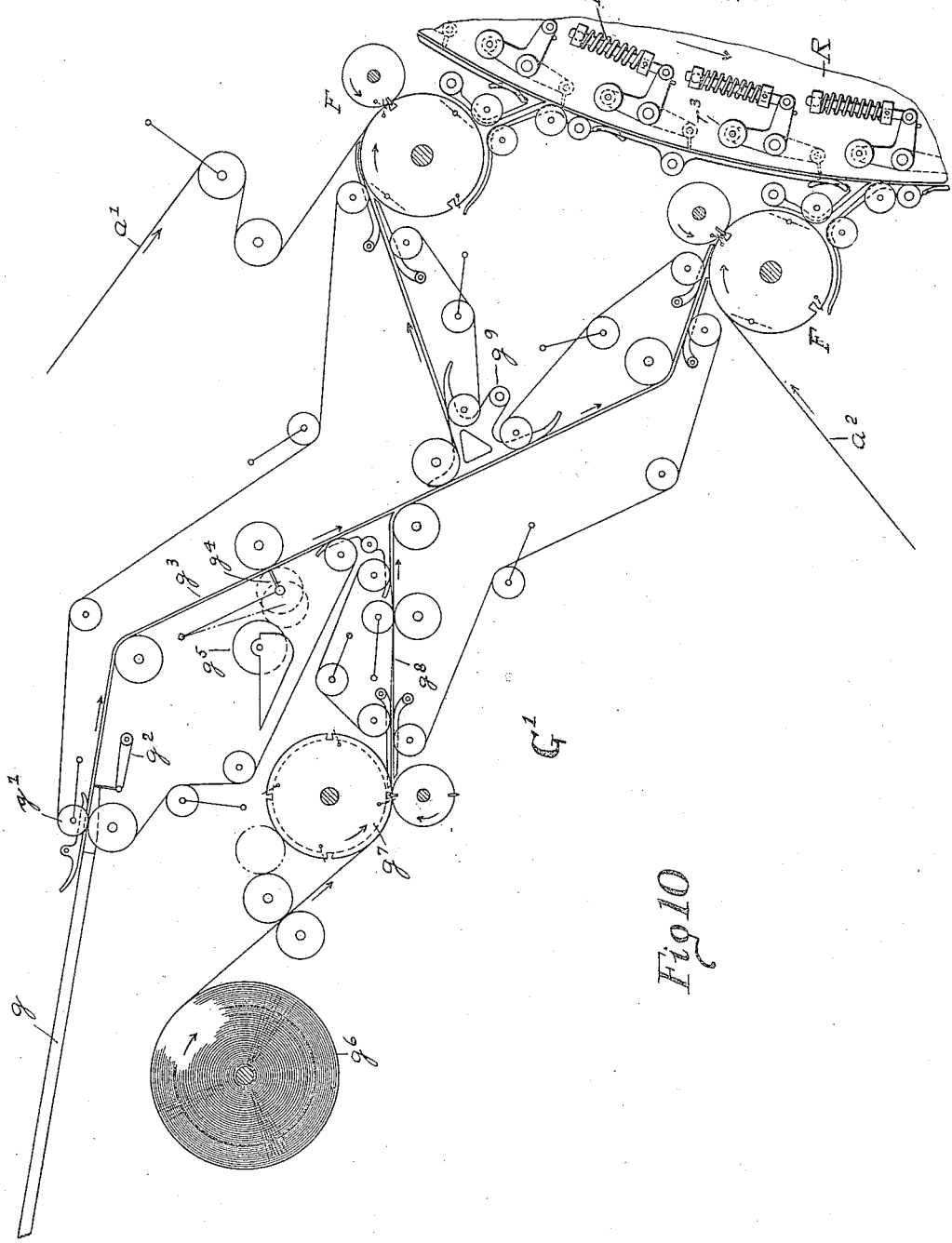

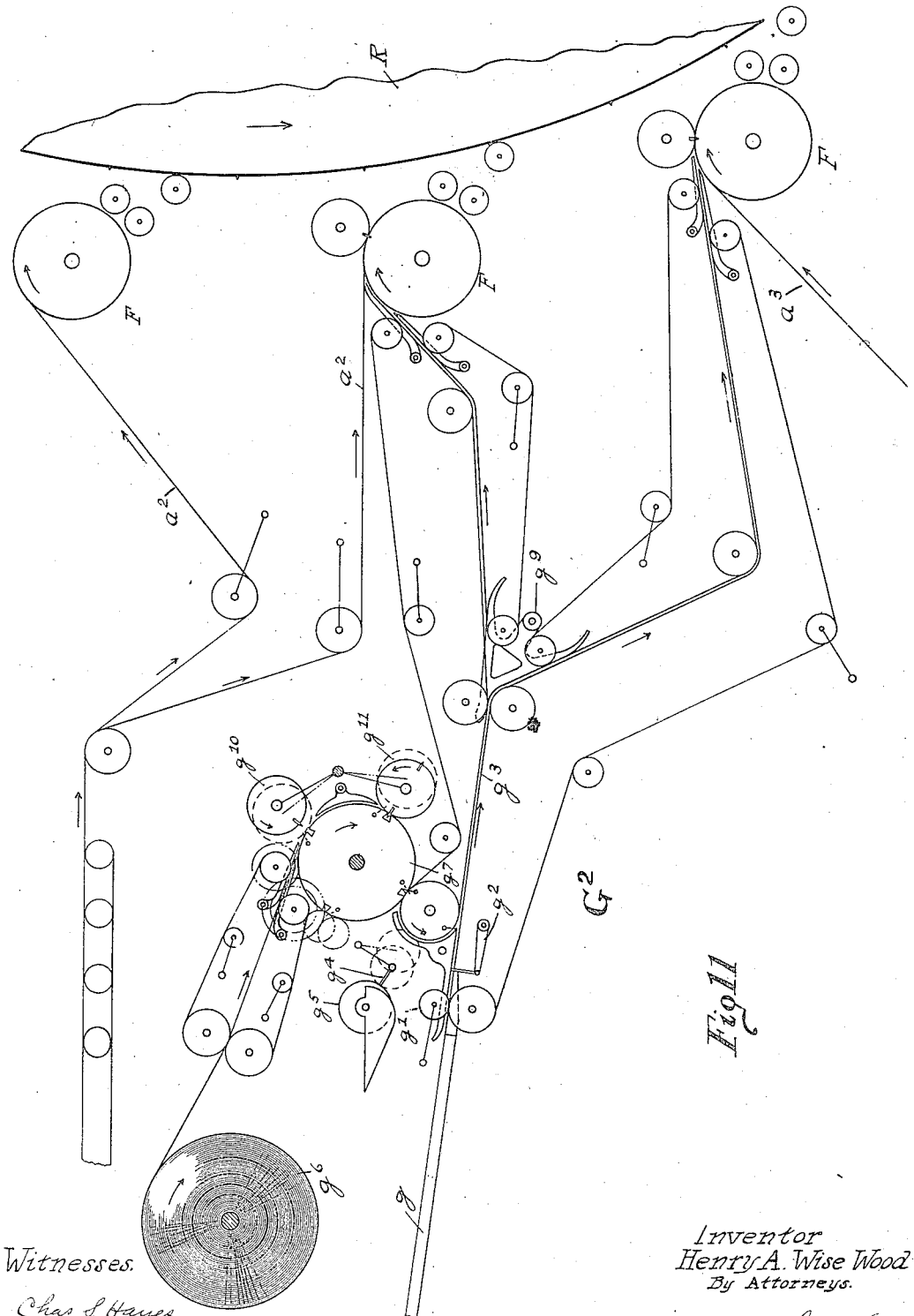

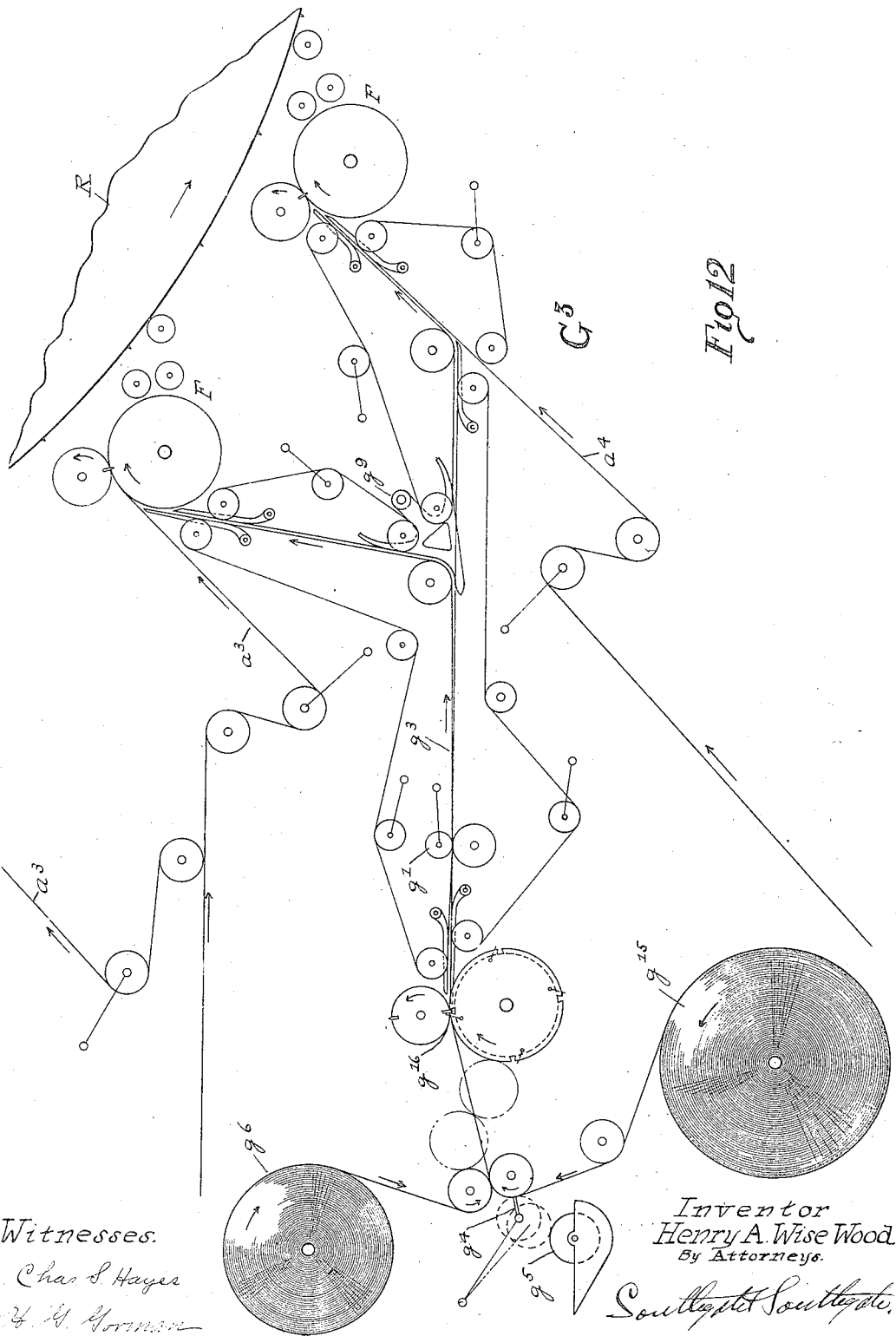

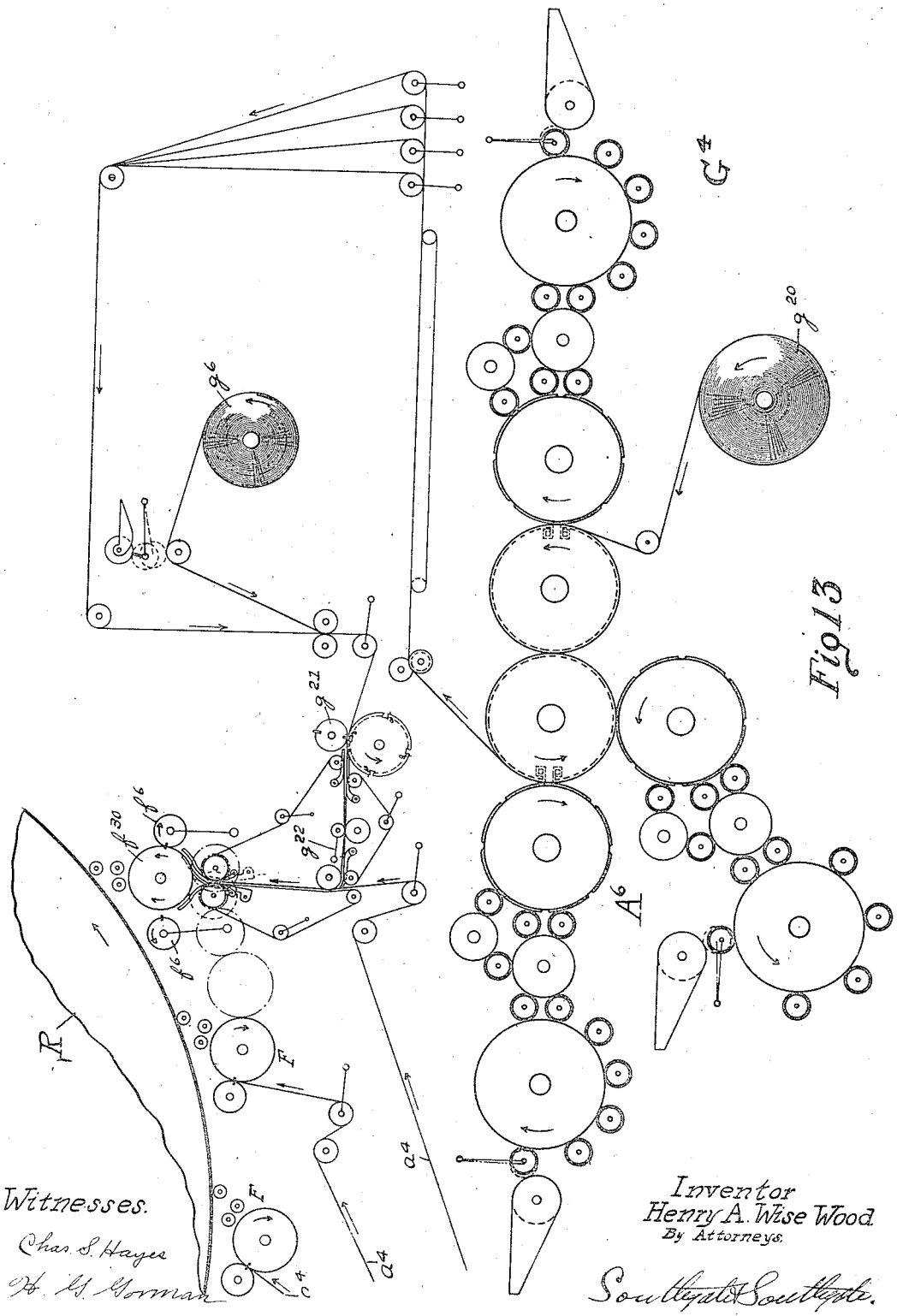

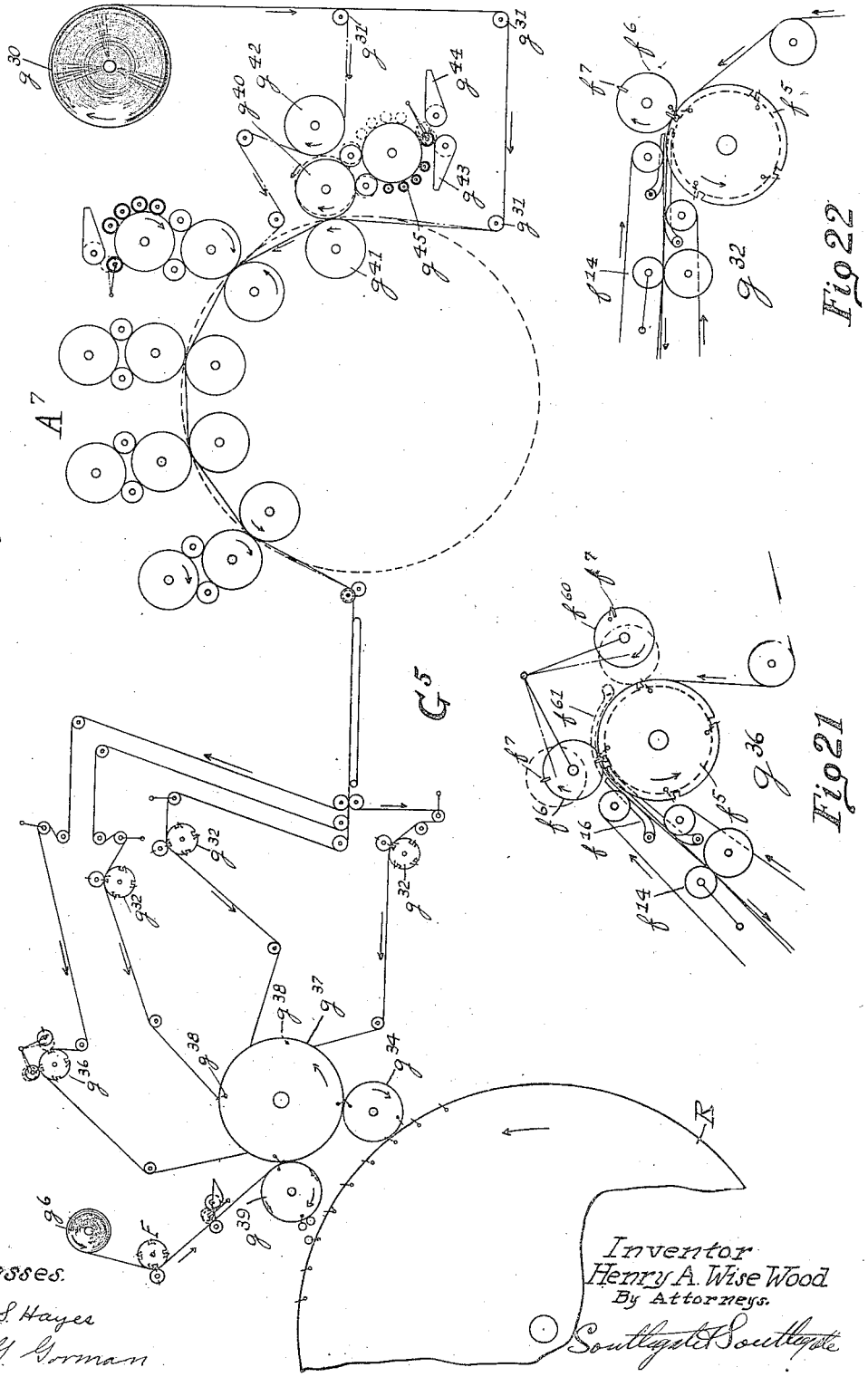

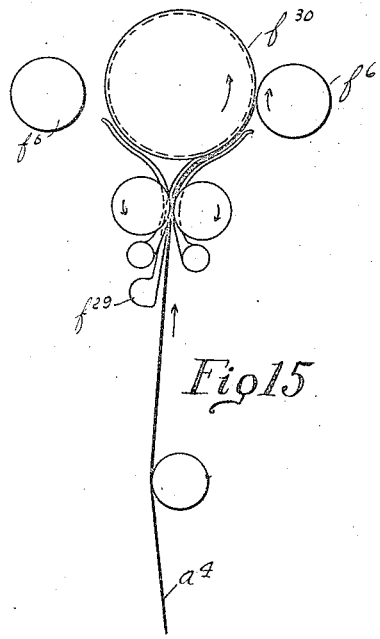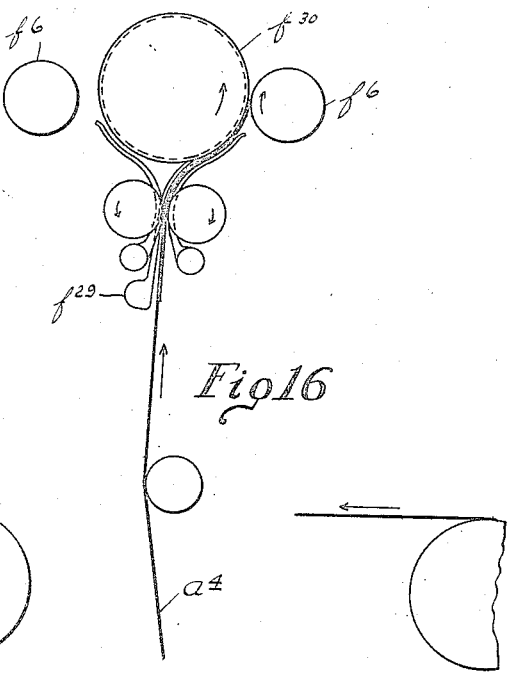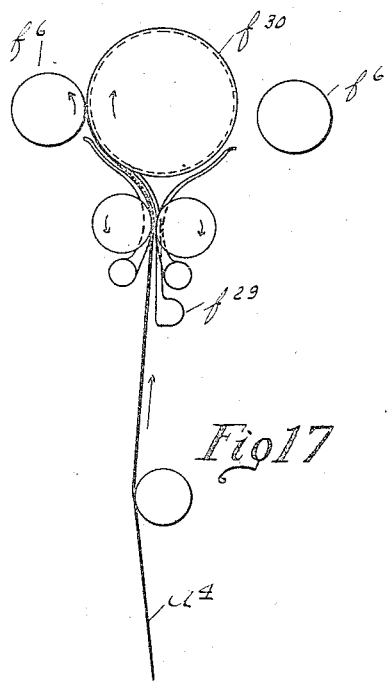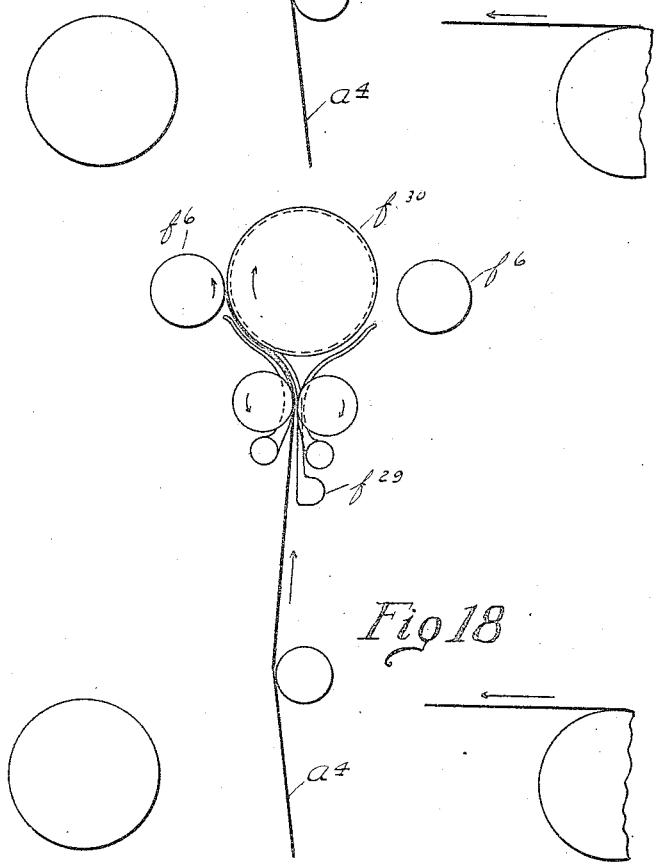

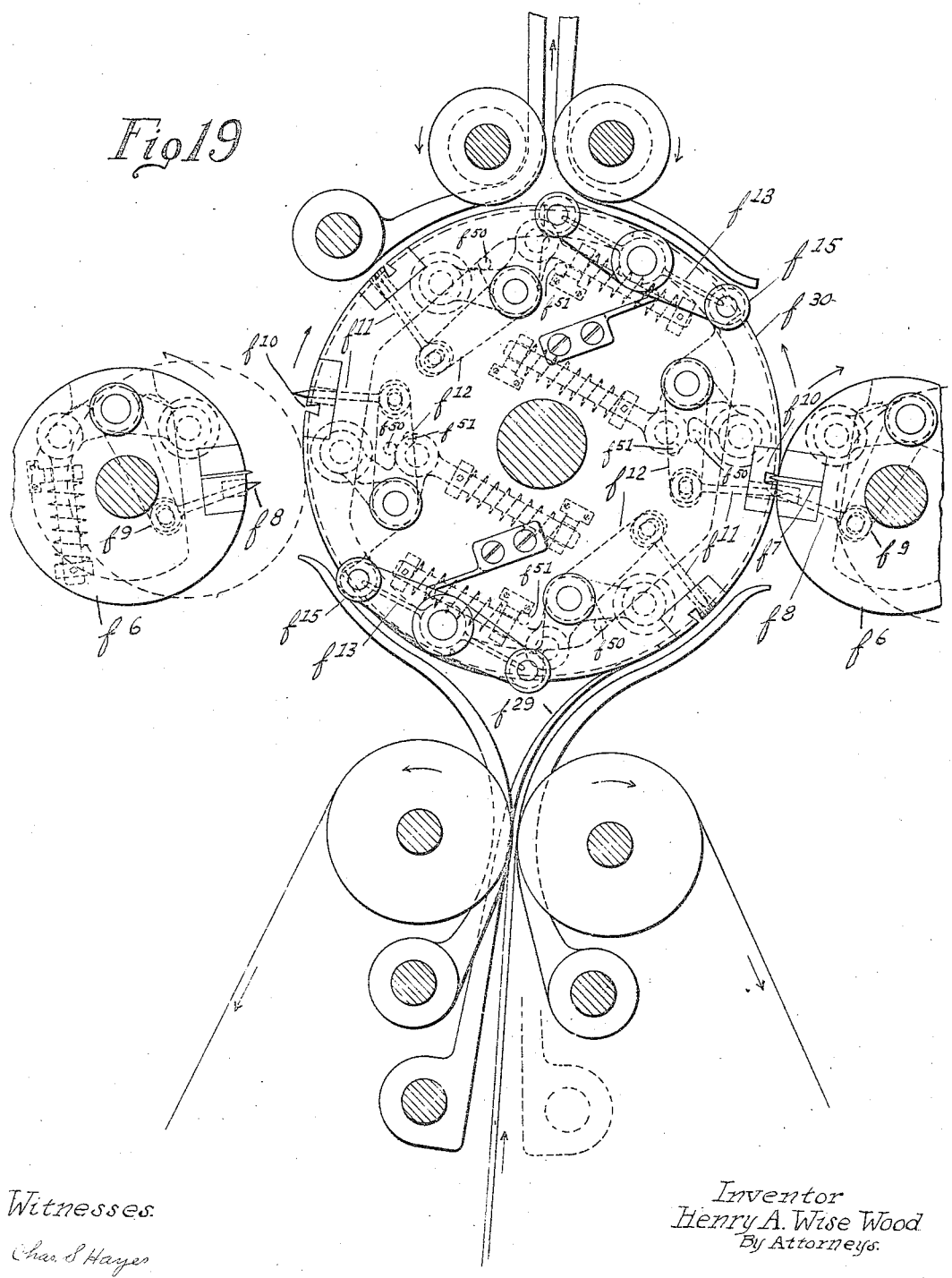

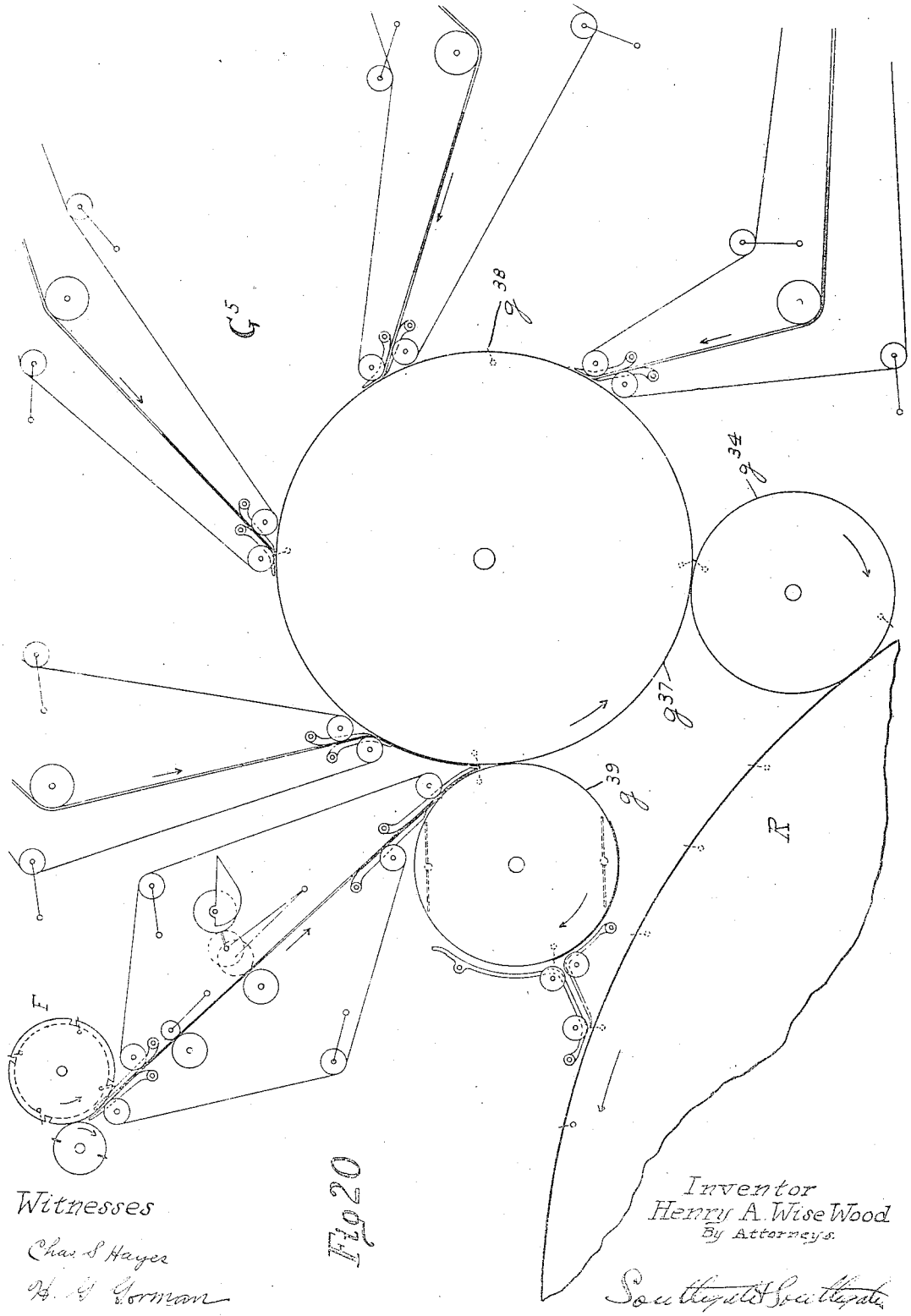

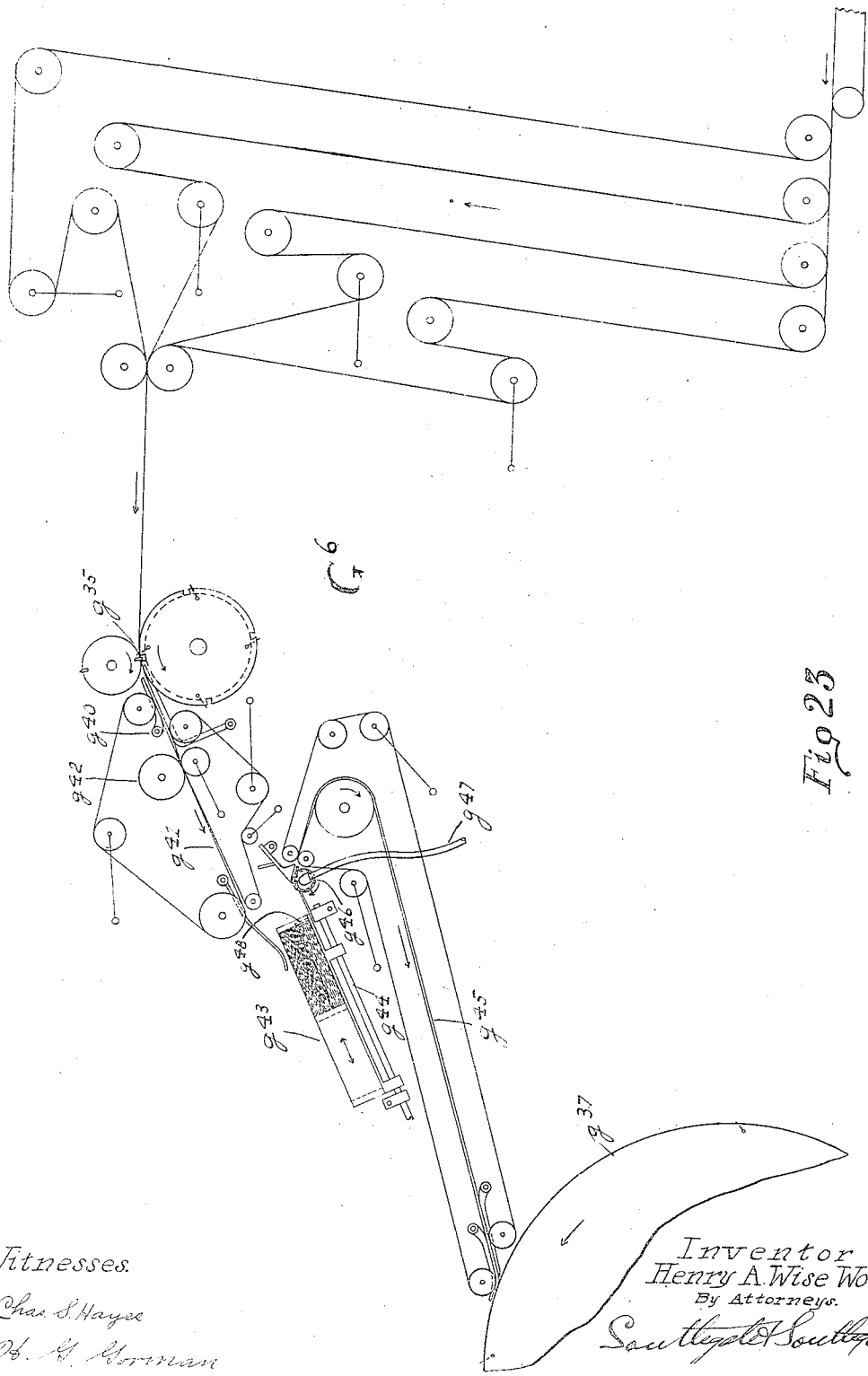

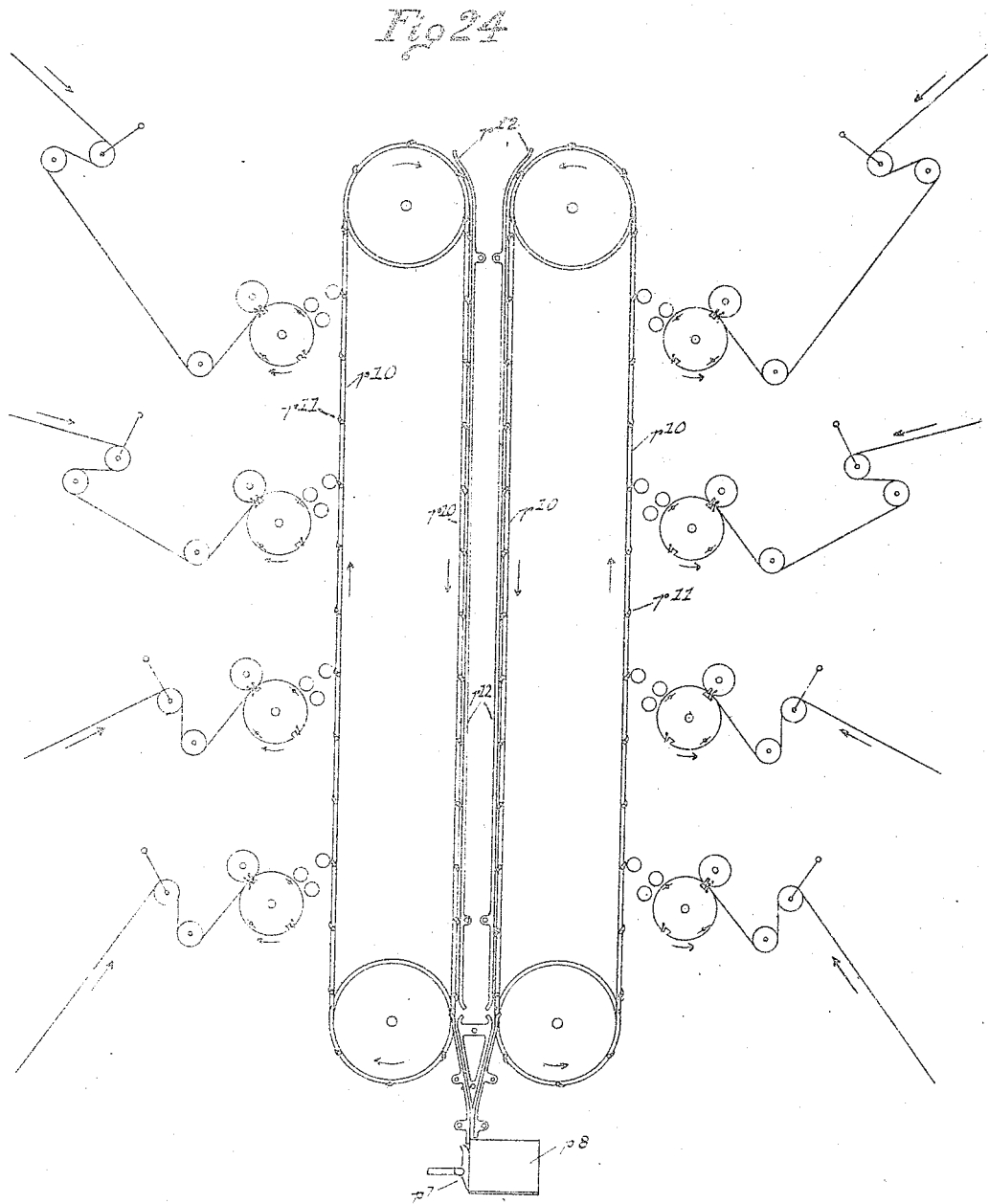

UNITED STATES PATENT OFFICE.

HENRY A. WISE WOOD, OF NEW YORK, N. Y., ASSIGNOR, BY MESNE ASSIGNMENTS, TO WOOD NEWSPAPER MACHINERY CORPORATION, OF NEW YORK, N. Y., A CORPORATION OF VIRGINIA.

MACHINE FOR MAKING MAGAZINES AND THE LIKE.

1,232,639.   Specification of Letters Patent.   Patented July 10, 1917.

Application filed September 7, 1910. Serial No. 580,870.

*To all whom it may concern:*

Be it known that I, HENRY A. WISE WOOD, a citizen of the United States, residing at New York, in the county of New York and State of New York, have invented a new and useful Machine for Making Magazines and the like, of which the following is a specification.

This invention relates to the art of printing books, magazines, and newspapers which are made up of several signatures, varying in character of paper and number of pages, together with inserts of one or more leaves.

The principal objects of this invention are to provide an organized mechanism for the purpose of making a whole magazine, book, newspaper, or the like, with perhaps the exception of an occasional insert, at a single operation; to provide a practicable and efficient machine or plant for this purpose of such a character that well known forms of printing presses, folding machines, inserting devices, collating devices, stapling devices, and covering devices, can be employed, and in fact to secure a system in which any and all types of these machines can be used to advantage; to provide for great flexibility in the order and arrangement of the products of the several presses, so that signatures can be introduced into the magazine in any desired order, and so that sheets or signatures from a press or feeding device can be introduced either as inserts or onserts at will; and to provide a novel arrangement and combination of two or more printing presses or decks of the same or dissimilar types, with other mechanism whereby relatively low grade and high grade work can be done simultaneously at different speeds and delivered at the same speed, one slowly printed product for each rapidly printed product; and to provide improvements in the relative arrangement and connection of the several parts, of such a nature that the books, magazines, or the like can be produced at a very high speed, without the intervention of workmen beyond the preparation of some of the various parts. In this way what is becoming a most important item in the manufacture of magazines, namely, the time required to produce a complete article, is materially reduced. Another object of the invention is to save space, and a further object is to reduce labor and expense. The invention also involves several improvements in combinations of parts and details of construction, particularly in the gathering mechanism, and covering device, as will appear hereinafter.

Reference is to be had to the accompanying drawings, in which—

Figure 1 is a diagrammatic side view of a magazine making machine constructed in accordance with this invention;

Fig. 2 is a side view on an enlarged scale of a portion of the gathering mechanism and of the folding mechanism;

Fig. 3 is a plan of the mechanism shown in Fig. 2;

Fig. 4 is a view similar to Fig. 2, showing a modification;

Fig. 5 is a fragmentary plan of the same;

Fig. 6 is a plan of a portion of the machine shown in Fig. 1 illustrating the plate cylinder and turning bars;

Fig. 7 is a side view of the delivery;

Fig. 8 is an end elevation thereof;

Fig. 9 is a plan of a portion of the gathering drum showing delivery mechanism adjacent thereto;

Fig. 10 is a diagrammatic side view of one of the arrangements for feeding an insert to the front or back of the sheets from two of the decks of the press, on enlarged scale.

Figs. 11, 12, 13 and 14 are similar views showing modifications;

Fig. 15 is an enlarged diagrammatic view showing the course of the web through one of the folding and cutting devices shown in Fig. 13.

Fig. 16 is a similar view showing how the onsert is applied.

Fig. 17 is a similar view showing another course of the web.

Fig. 18 is a similar view showing the application of an insert.

Fig. 19 is an enlarged view showing details of the same.

Fig. 20 is an enlarged view of the folding and connected mechanism shown in Fig. 14.

Fig. 21 is a side view on enlarged scale of one of the cutting cylinders shown in Fig. 14.

Fig. 22 is a similar view of another form of cutting cylinder shown in Fig. 14;

Fig. 23 is a diagrammatic side view of another insert supplying arrangement; and Fig. 24 is a diagrammatic side view showing another form of gathering device that can be used in place of that shown in Fig. 1.

I have observed that both magazines and newspapers are in a state of transition, from two distinct products having entirely different fields, toward similar products of different forms occupying similar fields. Formerly the daily newspaper was almost entirely a news publication, and the magazine a literary one. But now the Sunday, and even daily newspapers, contain constantly increasing amounts of matter that has no direct relation to news and that may be prepared and run considerably in advance of the time of publication; while the magazines are constantly adding matter that is of the character of news, and needs to be treated as such, with alacrity. It is clear, therefore, that the two kinds of printing, one rapid and the other deliberate and artistic are being combined in the same publication to a constantly increasing extent. And this tendency is one that will become more rather than less pronounced as time goes on.

For these reasons it is becoming more and more necessary to print the news portions of magazines rapidly and at the last moment before the time of publication.

It is now the practice to begin all the slow work first and the quick work afterward in order that the whole may come together and be ready for assemblage and publication at the same time; that is, during the manufacture of the magazine its different kinds of pages are being printed at different times and in different places, and those which are printed first are accumulated and stored until they are needed to be used. The various parts when printed are folded and their several operations done at various times, are taken away by hand, and by hand are placed in the hopper of an assembling machine by which they are made into single bundles of a magazine each, then stitched and covered. For example, after the various parts are printed, those that are made on cylinder presses must be taken by hand to folding machines and folded, some of them to produce signatures of sixteen pages, and others of eight, four, or two pages. Then they must be removed from the folding machines by hand, stored till needed and then placed by hand in the assembling or gathering machine referred to. The parts made and folded by rotary presses must likewise be bundled and carried to the gathering machine; while the inserts, which are printed upon large sheets, must be put under cutting machines by hand, cut to the proper size, and then inserted by hand in their proper places, in or among the signatures which are to make up the magazine. As the relative arrangement of these various signatures and inserts is different for each issue it will be seen that the proper performance of these operations requires a high degree of expensive labor, and that the actual work requires a great deal of space, time, and skill.

As has been stated this invention has been made so that practically a whole magazine, or the like, may be made at a single operation. By coördinating a number of various printing presses and other devices ordinarily employed, and devising new ones to perform slow functions quickly the whole book is produced at a single operation, so to speak, of the combined machinery, and it is delivered immediately ready for sale, at a very high rate of speed.

The several features of the invention center about a gathering device R shown in Fig. 1, in the form of a large rotating drum. This is usually made of a width equal to the length of one of the pages to be printed, but may be double width, in which case some other elements are made double width. It may be considered that part of the rest of the mechanism is for printing, and performing other operations upon signatures or sheets, and feeding them to this drum, and other parts for removing the product from it, gathering it into a bundle and completing the magazine or the like; so the mechanism may be divided into three groups. It will be remembered that it has been stated that one of the objects of the invention is to provide for accomplishing the results set forth above without dispensing with or materially altering the printing and other machines now in use, so that many of the mechanisms of these machines which are in stock and which are being manufactured at the present time can be used with this invention without involving any expensive changes. Following out this idea conventional forms of these machines are in most cases illustrated.

The press consists of one or more decks arranged on one or both sides of the gathering device. Fig. 1 shows a four deck web printing press $A^1$, $A^2$, $A^3$, $A^4$ provided with any desired or usual kind of inking mechanism B, B', operating in the usual or any well known way. Any number of presses can be arranged around the gathering device and a second one $A^5$ is indicated in dotted lines. If desired also the press or presses can be located in this dotted line or any other convenient position instead of the full line position. The decks are intended to deliver all of their printed products to the gathering device R.

The cylinders C of this press are divided up having a plurality of plates C' both longitudinally and circumferentially. For the purpose of illustration each of these plate cylinders is shown as provided with thirty-two plates arranged in four circles of eight plates each, that is, each cylinder has four plates along the cylinder and eight around it. These can all be original plates in some cases or two sets of duplicate ones in others. With this arrangement each press can be made to print thirty-two impressions on a web at each revolution. The web, having four impressions across it, is slit to form four webs. It will be understood of course that plate cylinders having different arrangements of plates can be used to print a smaller or larger number of pages and that any kind of inking mechanism is employed so as to print in black or colors as desired. In the drawings two kinds of inking mechanism are shown on two of the decks, the others being omitted for the sake of clearness.

Located adjacent to the plate cylinders C are slitting devices D each having slitting cutters D' opposite the circumferential spaces between the plates C'. Each deck also is provided with turning bars E', E², E³, E⁴, so as to cross and associate the webs and bring them to a one-page width or two page width as desired. With a space between these narrow webs this allows two similar or different magazines to be delivered at the same time.

In the form shown in Fig. 1, the upper and lower deck A¹ and A⁴ are shown as arranged to produce four webs each, and mechanism is provided by which after these webs are associated by the turning bars so as to come one over the other they can all be passed to the drum R in a plurality of ways. However, as illustrated, one of the webs from the upper deck is omitted so that only three signatures are being produced by that deck. This shows how the machine can be used for magazines of various make-up. The lower and upper decks in the arrangement shown are delivering to the gathering drum four page signatures from four of the cutting, collecting, and folding devices. The two center decks A² and A³ are shown delivering eight-page signatures from two cutting, collecting and folding devices F. It will be understood of course that if the magazine requires a different number or size of signatures of this kind at this point the presses will be run in a different way, as for example, each of the center decks may run its webs to one of the devices F or some of the webs may be omitted altogether if that is required by the conditions. In that case one or more of the collecting devices F will be idle.

The combined cutting, collecting and folding devices can be constructed as is now common in this industry, the form shown in Fig. 2 comprising a folding cylinder $f^5$ and a cutting and collecting cylinder $f^6$. On the latter is a knife $f^7$ and pins $f^8$. The pins carry the sheet around the cylinder and impose it on the following sheet when the sheets are to be collected. In this form the pins are pivoted and mechanism $f^9$ which is well known in this art is provided to pull them into the cylinder to strip from the sheet. This mechanism is not illustrated and described in full as it is so well known. The cylinder $f^5$, which is shown as of twice the diameter of the cylinder $f^6$, has cutting grooves $f^{10}$, to coöperate with the cutting knives, and pins $f^{11}$ for carrying the sheets around to be folded. These pins are shown as pivoted and operated by mechanism $f^{12}$ like the other pins. It also has folding blades $f^{13}$ which operate in the usual manner to fold the sheets into the rolls $f^{14}$, cam rolls $f^{15}$ being employed as usual. The folded signature is then guided by the guides $f^{16}$ to the gathering drum where it is received by pins $r'$, grippers or the like. In this case these pins are shown as mounted on levers $r^2$ actuated by springs $r^5$ to transfer the signatures to the gathering drum R. These levers have cam rollers $r^3$ which are operated by a cam $r^4$ to withdraw the pins periodically. All of the pins described can be made stationary if desired, as shown in Figs. 4 and 5. In this case they are provided with throw-offs $f^{17}$—$f^{18}$, etc., to strip the sheets from the pins, these throw-offs being operated in a well known manner as understood in this art. It will be understood, of course, that other equivalents of this mechanism can be employed so long as a plurality of elements are located along the operating surface of the gathering device to take the signatures from the several printing machines or decks and deliver them to the gathering device which takes them up and delivers them in the proper order to the delivery cylinder which will be described hereinafter.

In addition to what has been described it is to be understood that the presses or decks referred to need not be of the same character, as it is one expressed purpose of this invention to provide for using many types of printing presses in the same machine. In this character of work it is common to use both flat sheet bed and rotary web presses, and it is preferred that the ordinary high-speed web presses be employed for the work that has been described above, and that flat presses be employed for the kind of work that has to be done more carefully and accurately and at a slow speed, while a less high grade of work may be done by a press to be described later. For the purpose of illustrating how work from the low speed flat presses can be employed in connection with this machine, and to show another important feature of the invention, several arrangements are illustrated herein and referred to as used for the purpose of supplying inserts and of doing so either with or without a sheet of tissue paper. It will be understood, of course, that these inserts may consist of a single sheet or a double sheet folded once to form a signature of two sheets, or twice to form one of four sheets, etc.

In the form shown in Fig. 10 an insert feeding device G' is shown for feeding sheets which have been previously printed, so the press is not illustrated. A flat bed or any other kind of press can be used of course, but it is preferred to use a press or presses capable of doing a high class of work. These flat sheets are fed by hand or mechanically from a feed board $g$. They may be of from two to sixteen pages, or even more. They are fed between gages in the usual way to rolls $g'$ and are controlled by feed gages $g^2$ so that the sheets are fed forward one at a time along a tape-run-way $g^3$. If tissue is to be supplied, as is shown in this case, they are supplied with a line of paste by means of a paste blade $g^4$ which moves to and from a paste roll $g^5$. The tissue web $g^6$ is fed at the proper speed to cutting cylinders $g^7$ and cut up into sheets, and then fed to tapes $g^8$ into contact with the pasted insert sheets. They are then fed along the runway to either of two cutting, collecting and folding cylinders F, being directed in the desired path by a switch $g^9$. It will be seen that the web $a'$ or $a^2$ from the deck A' or A² also can be fed to the same cutting, collecting and folding device F as the insert, and that the insert is fed on the inside of the web or on the outside so as to form what is technically known as an insert in one case and an onsert in the other. In either case it is delivered to the gathering device R with the signature formed from the web of one of the decks of a coöperating press.

In Fig. 11 substantially the same conditions exist, except that with this insert feeding device G² means are shown for cutting the tissue web into sheets of different lengths and paste is applied to the tissue sheets instead of to the insert. One cutting cylinder $g^{10}$ is shown, to cut off two page lengths and another $g^{11}$ to cut off one page lengths. The proper one of these cylinders is thrown into contact with the large grooved cylinder as desired. The same reference letters are used on this figure where possible.

Numerous variations can be made in these arrangements in accordance with this invention, and in Fig. 12 another similar arrangement G³ is shown, but instead of the flat sheet insert, a printed insert web is drawn from a roll $g^{15}$ and cut off to proper length by means of a cutting couple $g^{16}$, the tissue being brought in before the cutting operation so that the two webs are cut simultaneously. In this case the paste is applied to the insert, but could be applied to the tissue web equally as well. This insert can be associated with the web $a^3$ or $a^4$. Otherwise the same reference characters are used as in Fig. 10.

In the form shown G⁴ in Fig. 13 the same conditions prevail as in Fig. 10, except that the insert is drawn from a roll $g^{20}$ and printed by means of a deck or press A⁶. In this case, however, the speed is preferably lowered so that a higher grade of work can be produced. The press can be of the same type as the press A⁴, or a different type, and can use ordinary stereotypes, electrotypes, engraved or other plates. In this case a cutting device $g^{21}$ is employed. Then the sheets are speeded up by an extra drop roll and tape construction $g^{22}$ as is well understood in this art. In this case the tissue is shown coming in with the web before the cutting operation, and the web is pasted as before. The web $a^4$ from the regular press, for example, is shown coming in also as will be understood readily.

When the machine is built as above described with the insert machine G⁴, many combinations of signatures can be produced among them being the following:

Printing from four full width, or four page wide rolls the printing cylinders making one revolution to one revolution of the gathering drum, which is referred to as full speed, and using all cutting devices, but not collecting, gives thirty-two four page signatures, and sixteen eight page signatures to a cycle of the press. Running at full speed, using all cutting devices and collecting twice to a cycle of the press gives sixteen eight page signatures and eight sixteen page signatures. If desired, the ratio of the gathering drum to the press cylinder can be changed when collecting, namely one quarter or one half speed or such ratio as is applicable to conditions.

For every page that the roll of paper is narrowed, subtract sixteen pages from the product of that deck. Other combinations of signatures can be obtained, such as an upper and lower deck, running half the product to one cutting and collecting device and half to two of the above devices, or running the product in halves to two of the above devices. The insert devices Figs. 10 and 11 furnish inserts of two to sixteen pages (varying by twos) the length of sheet fed varying to suit the number of pages. The insert device Fig. 12 furnishes inserts of two to sixteen pages, (varying by twos) the paper being drawn from the roll at a speed to suit the number of pages.

The insert device Fig. 13 is arranged to carry eight plates around the cylinder and four or less plates along the cylinder. With this device running at the same speed as the main press, it will furnish the following signatures, per magazine:—

| 4 plates wide, | furnishes | 4 signatures, | 16 pages each |
|---|---|---|---|
| 4 " | " | 2 " | 32 " " |
| 4 " | " | 1 " | 64 " " |

| 3 plates wide, | furnishes | 4 signatures, | 12 pages each |
|---|---|---|---|
| 3 " | " | 2 " | 24 " " |
| 3 " | " | 1 " | 48 " " |

| 2 plates wide, | furnishes | 4 signatures, | 8 pages each |
|---|---|---|---|
| 2 " | " | 2 " | 16 " " |
| 2 " | " | 1 " | 32 " " |

| 1 plate wide, | furnishes | 4 signatures, | 4 pages each |
|---|---|---|---|
| 1 " | " | 2 " | 8 " " |
| 1 " | " | 1 " | 16 " " |

Running at one half the speed of the main press it will furnish the same number of signatures of one half the number of pages, or one half the number of signatures of the same number of pages as for full speed.

Running at one quarter the speed of the main press, it will furnish one half the number of signatures of one half the number of pages, or one quarter the number of signatures of the same number of pages as for full speed. Running at one eighth the speed of the main press it will furnish one quarter the number of signatures of one half the number of pages, as for full speed. It will be understood that with the insert devices $G'$ $G^2$ and $G^3$ numerous results can be obtained similarly. The products of the insert printing devices $G'$, $G^2$ and $G^4$ can be run on the gathering drum as inserts or as complete signatures, as desired.

A preferred arrangement of convertible insert and onsert mechanism is shown in Figs. 15, 16, 17, 18 and 19, adapted for use with the press shown in Fig. 13. The web $a^4$ can be switched by switches $f^{29}$ to either side of the folding cylinder $f^{30}$ which is arranged similarly to the folding cylinder $f^5$ except that the number of pins $f^{11}$ and operating devices therefor is doubled. In order to shift from one side to the other for this purpose one set of pins $f^{11}$ is thrown out of operation. Stops $f^{50}$ are provided each adapted to be placed in either of two holes $f^{51}$ in the cylinder. When in one hole the stop prevents the pin projecting too far and when in the other it prevents it projecting at all.

In Figs. 14, 20, 21 and 22, another machine $G^5$ is shown for printing the inserts in which they can be printed in a plurality of colors on one side of the web. It will be understood of course that by a similar arrangement color printing on both sides can be done. The web is drawn from a reel $g^{30}$ over web rolls $g^{31}$, over a large impression cylinder or a plurality of small impression cylinders of a press $A^7$ as desired, printed by the several plate cylinders in a well known way, slit, cross-associated by the turning bars, and led to cutting devices. If it is desired to print on both sides of the web it is led through the press as shown in dotted lines at the right of Fig. 14. In this case the plate cylinder $g^{40}$ is movable so as to contact with either of two impression cylinders $g^{41}$ or $g^{42}$. Two ink fountains $g^{43}$ and $g^{44}$ are shown for two colors of ink. When the plate cylinder is shifted the inking mechanism $g^{45}$ can be shifted also as shown in dotted lines.

The cutting devices $g^{32}$ shown here preferably are the same individually as those shown in Figs. 2 and 4 except that the folding mechanism is omitted. They operate as follows:—A grooved cutting cylinder $f^5$ is used with a knife cutting cylinder $f^6$ having two knives $f^7$ when two page signatures are desired. Another cutting device $g^{36}$ is shown in Fig. 21 having the same features and in addition a cutting cylinder $f^{60}$ having one knife. For four page signatures the cutting cylinder $f^6$ is moved out of operation and the cylinder $f^{60}$ having one knife is moved into operative position, the guides $f^{16}$ being replaced by guides $f^{61}$, or in Fig. 22 one of the knives of the cylinder $f^6$ is removed. For signatures of four, eight, or sixteen pages the collecting is done on the knife cutting cylinder $f^6$. The sheets are nipped by the drop rolls $f^{14}$ and advanced by the tapes which carry them to a cylinder $g^{37}$. This cylinder has pins or grippers $g^{38}$ for receiving the sheets and carrying them around so as to transfer them to a cylinder $g^{39}$ which folds and transfers them to the gathering drum R. This applies to all but two-page signatures which are transferred to the drum R from the cylinder $g^{37}$ by a cylinder $g^{34}$. If tissue is desired with the inserts it is drawn from a roll cut, pasted and carried to the cylinder where it meets the signature as indicated.

The insert device $G^5$ can be arranged to carry eight plates around the cylinder, and four or less along it. With this device running at the same speed as the main press, arranged four plates wide and with four collecting devices it will furnish sixteen, eight, four, two or one signatures, having respectively four, eight, sixteen, thirty-two or sixty-four pages. In the first case there will be no collection, in the second one, and in the other cases three. When the cylinder is run with a less number of plates in width, and a less number of collecting devices, the number of signatures and pages will be restricted in proportion. Running at one half the speed of the main press this press will furnish the same number of signatures of one-half the number of pages or one half the number of signatures of the same number of pages as for full speed, and corresponding reductions will be made when running at one-quarter of the speed of the main press, and at an eighth, sixteenth, or less. When running one-thirty second the speed of the main press it will furnish one two-page signature. It will be seen that by this construction, one is enabled to supply to a fast running press, as for example, $A^1$ sheets, such as frontispieces or inserts, which are being simultaneously printed but at a very much lower rate of speed. To take one of the examples given above, supposing the press $G^5$ is two pages wide and eight in circumference; that is, having sixteen plates on the cylinder all duplicates, it will deliver sixteen products at each revolution. These products may be fed to the gathering drum R with the product of another press at $A^1$, which is running sixteen times as fast, and will supply the gathering mechanism with a product for each product of the other press. That is, in this case if the press $A^1$ is running sixteen times as fast as the press $G^5$ one product of each will be fed to the gathering drum R at the same time. In this way the presses for the ordinary work can be speeded up as much as necessary, and yet the presses for the color work and other particular parts can be run at such a low speed that the product can be made with a very high degree of excellence. With the feeding devices shown it is obvious that the circumferential products of the press $G^5$ will follow each other, as is usual with a press which does not collect, by means of this distributing mechanism. All the lateral products of the press as well are turned into the same stream so that the entire product will be delivered in a series, one after the other, to the large gathering drum, a single product for each turn, thus both the lateral and circumferential products of the press are distributed in sequence. In this way it will require sixteen turns of the drum in order to exhaust the products made by one turn of the press. At the same time, the drum is collecting the products of sixteen revolutions of the press $A^1$ turning out ordinary work. It will be understood of course that if desired the collating device can be arranged so that the product of this press will be run out in two streams instead of one, in which case the press must run at one-eighth of the speed of the other press $A^1$, if that turns out one product per revolution. Supposing this to be applied to a newspaper press of the present style, which is turning out a Sunday paper at the rate of 24,000 an hour, and which prints two products to a revolution, the addition of this press to the newspaper press would result in supplying a colored insert for every paper, and yet the speed would be only one-eighth of that of the news press, or one-sixteenth if applied to a press of another type turning out only one product for each revolution. It is obvious also that the width of this machine can be increased within the scope of this invention so as to produce five products in width or any other practical number and that the speed will then be reduced proportionately. Similar results can be obtained with the other insert presses or feeders shown.

In Fig. 23 is shown a modification $G^6$ of the principles shown in Figs. 14, 20, 21, and 22 being the same as that set up to and including the turning bars. The web 12 led from them over web rolls to a cutting device $g^{35}$ which is the same as the cutting device shown in Fig. 22. After being cut, the sheets are carried by means of guides $g^{40}$ tapes $g^{41}$ and nipping rolls $g^{42}$ to a receiving box $g^{43}$ which is adjustable for one or two page length sheets. The sheets are fed from the box by any style of under feed, as $g^{44}$. They are then carried to the cylinder $g^{37}$ by means of tapes $g^{45}$ and guides as indicated. From this point the machine is the same as that shown in Fig. 14.

The form of feed preferred consists in the provision of means (not shown) for reciprocating the box $g^{43}$ toward and from a rotary perforated cylinder $g^{46}$ connected with an exhauster by a hose $g^{47}$. When the box moves up so that the bottom sheet comes into contact with the cylinder $g^{46}$ the suction holds the bottom sheet and the cylinder feeds it to the tapes. The box has a gage $g^{48}$ to permit only one sheet to leave the box at each reciprocation.

Whatever form of press is used for producing the main product and the ordinary signatures of the magazine, and whatever form of press for producing the color work and other inserts and smaller signatures, it will be obvious from consideration of Fig. 1 that these various products will be delivered one by one to the gathering drum R in a predetermined order, and that during a complete revolution thereof the entire magazine will be applied to it, except the cover. The next step in the operation of this machine is to deliver this product, making the least possible number of alterations in the ordinary delivery device, so that the entire magazine is produced by the machinery without handling the signatures or even the stapled product. For this purpose I have shown a delivery device P involving a delivery cylinder $p$ having pins $p'$ and a stripper $p^2$ for taking individual portions of the product from the gathering drum. This delivery device is shown as provided with an endless chain mechanism $p^3$ having hooks $p^4$ on the delivery side thereof which receives the several signatures, inserts, or the like, one by one preferably, back of a guide $p^5$. The endless chain travels downwardly on its delivery side and the hooks support the signatures and inserts so as to lower them on a support $p^6$ which projects out between the strands of the chain so that the signatures and sheets are left upon it as the hooks descend. A plunger $p^7$ is then brought up automatically, by mechanism not herein shown in full, so as to push the signatures or the like back in the collating device $p^8$ of which the support $p^6$ forms the bottom. They are held in place by hooks $p^9$. Periodically, that is, when the material for a complete magazine has been introduced into the collating box, the bottom $p^6$ is shifted so as to allow the whole bunch of sheets and signatures to drop down between guides $p^{10}$ where they are held firmly in position and are stapled by a stapling device $p^{11}$ not shown in detail. Then by other automatic mechanism the bottom $p^{12}$ of this box is withdrawn so as to permit the stapled inside of the magazine to fall down between nipping rolls $p^{13}$ where it engages a cover which has been fed in from the side. This cover is fed in from a cover board $q$ by nipping rolls $q'$ controlled by a feed gage $q^2$ and is taken by tapes to the guides $q^3$ in a well known way. In passing to these guides it receives paste from a pasting device $q^4$ so that when the nipping rolls $p^{13}$ feed the bottom of the magazine down the pasted portion of the cover comes under the back of the inside, and both are drawn down through the lower nipping rolls $p^{14}$ into a delivery box $p^{15}$ which is provided with a plunger $p^{16}$ working in a well known way. In this way the completed magazines are delivered one at a time, or if the machine is set up double, two at a time, without the intervention of any hand manipulations, and without even having the parts carried from one place to another by hand or human agency of any kind.

Although the gathering device has been referred to and shown throughout as a drum, it will be understood that other types of gathering devices can be employed. One of them is shown in Fig. 24. In this figure the main presses can be the same as heretofore described, but their cutting, folding and delivery mechanisms are arranged along one or both sides of the gathering device in a straight line. The latter consists of a pair of chains $r^{10}$ having grippers $r^{11}$ or the like for taking the signatures from the guides of the folding devices. They pass the latter through guides $r^{12}$ which take them to a delievery which can be of the same character as that already described.

While I have illustrated and described several preferred modifications of the invention and of different parts thereof, I am aware that many other modifications can be made even in those parts which have been illustrated in several forms, and that as far as most of the features of the invention are concerned, they do not depend upon the details of construction. Therefore I do not wish to be limited to any particular type of the various machines or elements of the plant or mechanism described or to the other details of construction shown, except as expressed in the claims, but what I do claim is:—

1. In a machine of the character described, the combination with a web printing press, of a slitting device for slitting the product of the press into a plurality of webs, a collating device for cross associating said webs, a movable gathering device having a capacity for holding a plurality of printed products at the same time in different positions, and a plurality of means arranged at different points along the gathering device for cutting said webs and delivering them individually thereto.

2. In a machine of the character described, the combination with a plurality of web printing presses, of slitting devices for slitting each of the products into a plurality of webs, a movable gathering device, means for cutting the several slit webs cross-wise, and means for delivering cut products from several webs from each press to the gathering device each at a different point along the surface thereof.

3. In a machine of the character described, the combination with a web printing press, of a slitting device for slitting the product into a plurality of webs, a movable gathering device having a plurality of means spaced apart thereon for holding sheets or signatures, and means for cutting said webs into sheets or signatures and simultaneously delivering sheets or signatures from each of a plurality of webs to the gathering device.

4. In a machine of the character described, the combination with means for feeding a plurality of webs, of a movable gathering device, and means for cutting said webs into sheets or signatures and delivering sheets or signatures from each of a plurality of webs to the gathering device at a plurality of points, said gathering device having means at each of said points for holding a plurality of said sheets or signatures as delivered to it.

5. In a machine of the character described, the combination of means for feeding a plurality of webs one over the other, means for feeding another set of webs in vertical alinement with the first named webs, a gathering device, and a plurality of means arranged at intervals along the gathering device for taking said webs, cutting them into sheets, and delivering them to different points along the surface of the gathering device.

6. In a machine of the character described, the combination of means for feeding a plurality of webs, a gathering device, and a plurality of means arranged along the rotary gathering device each for taking one of said webs, cutting it into sheets or signatures, and simultaneously delivering the sheets or signatures to the gathering device at a plurality of points along the surface thereof.

7. In a machine of the class described, the combination with means for feeding a plurality of webs, a plurality of cutting devices, means whereby each of said webs can be delivered to a separate cutting device or a plurality of them can be delivered to a single one at will, a gathering cylinder arranged to have its surface move past the several cutting devices, and means for taking the sheets or signatures from several of said cutting devices and applying them to the gathering cylinder.

8. In a machine of the class described, the combination with a web printing press, and a slitting device for dividing the product into a plurality of webs, of a gathering device, a plurality of cutting devices arranged along the surface of the gathering device, and means whereby each of said webs can be delivered to a separate cutting device or any number of them can be delivered to a single one at will.

9. In a printing plant, the combination with a web printing press, of a slitting device for dividing the product into a plurality of narrow webs, turning bars for bringing a plurality of said webs into registration with each other, a gathering device adapted to move through a prescribed cycle, a plurality of cutting devices arranged at intervals along the surface of said gathering device, means for feeding said webs to one or more of said cutting devices, and means whereby the gathering device will gather the sheets from all of said cutting devices.

10. In a printing plant, the combination with a web printing press, of a slitting device for dividing the product into a plurality of narrow webs, turning bars for bringing a plurality of said webs into registration with each other, a plurality of cutting devices, means for feeding said webs to one or more of said cutting devices, a gathering device having a plurality of means thereon for gathering the sheets from all of said cutting devices, and a delivery device adapted to receive an entire set of sheets and signatures from each of said means on the gathering device in order as it moves through a cycle of operations.

11. In a printing plant, the combination with a web printing press, of a slitting device for slitting the product of said press into a plurality of webs, a movable gathering device, means for delivering said webs in the form of sheets or signatures to the gathering device one from each web to each of a plurality of points along the path of travel thereof, means on the gathering device for holding a plurality of said sheets and signatures at each of said different points along the surface thereof, and means associated with said gathering device for delivering said sheets and signatures one by one as the gathering device travels.

12. In a printing plant, the combination of means for feeding a plurality of webs, a gathering device, a plurality of means arranged along the path of travel of the gathering device for receiving said webs, cutting and folding them to form sheets or signatures, means on the gathering device for taking said sheets and signatures and transferring them to the gathering device, and means for successively delivering said sheets and signatures from the gathering device as it travels.

13. In a machine of the character described, the combination with means for feeding a plurality of webs, of a gathering device having a plurality of means thereon for receiving sheets or signatures from the several webs, and means for delivering to each of said receiving means a sheet or signature from each of said webs and thereafter delivering a duplicate set of sheets and signatures to the receiving means, when the gathering device and consequently the receiving means are in a different position, with the previously delivered sheets and signatures still held by said receiving means.

14. In a machine of the character described, the combination with means for feeding a plurality of webs with their central lines substantially in the same plane, of a gathering device having a plurality of means thereon in the same plane for receiving sheets or signatures from the several webs, and means for simultaneously delivering to each of said receiving means a sheet or signature from each of said webs and thereafter delivering duplicate sets of sheets and signatures to the receiving means, when the gathering device and consequently the receiving means are in a different position, with the previously delivered sheets and signatures still held by said receiving means.

15. In a printing plant, the combination of a gathering device adapted to move in a predetermined path, a plurality of collecting, cutting, and folding devices arranged in order adjacent to said path, each one adapted to receive a web or plurality of webs, cut the same into sheets and fold said sheets to form signatures, a plurality of devices on the gathering device adapted to take said signatures and transfer them to the gathering device, and means whereby when the gathering device reaches a predetermined position all of said devices thereon will be in position to transfer all of said signatures to the gathering device.

16. In a machine of the character described, the combination of a gathering device adapted to move in a predetermined path, a plurality of collecting, cutting and folding devices arranged in order adjacent to said path, each one adapted to receive a web or plurality of webs, cut the same into sheets and fold said sheets to form signatures, a plurality of devices on the gathering device adapted to take said signatures and transfer them to the gathering device, means whereby all of said means will be actuated to transfer all of said signatures to the gathering device, and a delivery arranged adjacent to the path of travel of the gathering device and adapted to deliver the signatures therefrom one by one as the gathering device moves along its path.

17. In a machine of the character described, the combination of a cylinder adapted to receive one or more webs, a cutting cylinder adjacent thereto adapted to cut the webs into sheets and to collect a plurality of sheets thereon from the first named cylinder, means for taking the collected sheets from the cutting cylinder back on the first named cylinder, means for folding the sheets and transferring them from the first named cylinder, and a movable gathering device for taking the sheets from the first named cylinder.

18. In a machine of the character described, the combination of a cylinder adapted to receive one or more webs, a cutting cylinder adjacent thereto adapted to cut the webs into sheets and to collect a plurality of sheets thereon, means for taking the collected sheets from the cutting cylinder back on the first named cylinder, means for folding the sheets and transferring them from the first named cylinder, a gathering device arranged to travel adjacent to the first named cylinder, and means for taking the sheets from the first named cylinder and applying them to the gathering device, said means comprising mechanism mounted on the gathering device, and a cam for operating said mechanism.

19. In a machine of the character described, the combination of a cylinder adapted to receive one or more webs, a cutting cylinder adjacent thereto adapted to cut the webs into sheets, means for folding the sheets and transferring them from the first named cylinder, a gathering device arranged to travel adjacent to the first named cylinder, and means for taking the sheets from the first named cylinder and applying them to the gathering device, said means comprising mechanism mounted on the gathering device.

20. In a printing plant, the combination with means for feeding a web, a gathering device adapted to move through a prescribed cycle, a collecting, cutting and folding device arranged adjacent to said gathering device, means for feeding said web to said collecting, cutting and folding device, means whereby the gathering device will gather the products from said folding device, means for feeding a sheet or insert to said collecting, cutting, and folding device, and means for feeding a tissue sheet into contact with the insert before it reaches the collecting device.

21. In a printing plant, the combination with means for feeding a plurality of narrow webs, a gathering device adapted to move through a prescribed cycle, a plurality of collecting, cutting and folding devices arranged at intervals along the surface of said gathering device, means for feeding said webs to one or more of said collecting, cutting and folding devices, means whereby the gathering device will gather the products from all of said folding devices, means for feeding a sheet or insert to one of said collecting, cutting and folding devices, means for feeding a tissue sheet into contact with the insert before it reaches the collecting device, and means for applying paste to attach the tissue sheet to the insert.

22. In a printing plant, the combination with means for feeding a plurality of narrow webs, in registration with each other, a gathering device adapted to move through a prescribed cycle, a plurality of collecting, cutting and folding devices arranged along the surface of said gathering device, means for feeding said webs to one or more of said collecting, cutting and folding devices whereby sheets or signatures will be produced, means whereby the gathering device will gather the sheets or signatures from all of said folding devices, means for feeding an insert toward the gathering device, and means whereby said insert can be fed to either one of two of said collecting devices receiving webs from the press, whereby the insert can be located either in or on the signature produced from the web.

23. In a printing plant, the combination of a plurality of web printing machines or decks, a gathering device, a plurality of collecting devices arranged adjacent to the path of travel of the gathering device, means for feeding inserts one at a time toward the gathering device, and means whereby said inserts can be fed to a collecting device receiving a web from either one of said machines or decks and associated with signatures produced thereon before being delivered to the gathering device.

24. In a printing plant, the combination of a device for receiving sheets, means for feeding inserts or onserts one at a time toward the receiving device, and means whereby said inserts or onserts can be fed to either side of the receiving device.

25. In a printing plant, the combination of a device for receiving sheets, means for feeding inserts or onsets one at a time toward the receiving device, means whereby said inserts or onsets can be fed to either side of the receiving device, said receiving device being rotatable in either direction, and two sets of means thereon for holdng the sheets, each adapted to operate when the receiving device rotates in one direction.

26. In a machine of the character described, the combination with a folding cylinder and a coöperating cutting and collecting cylinder of means whereby the web can be switched to either side of the folding cylinder, so as to permit the folding cylinder to rotate with the web in either direction.

27. In a device of the character described, the combination with a folding cylinder and two cutting and collecting cylinders on opposite sides thereof, of means for directing the web to the folding cylinder, said means being reversible, whereby it is capable of directing the web to either side of the folding cylinder and between it and either cutting and collecting cylinder.

28. In a cutting, collecting, and folding mechanism for web presses, the combination with a folding cylinder, of a switch for directing the web thereto, said switch comprising a body having an extension projecting to one side and co-acting with the cylinder to guide the web thereon, said body and extension being reversible to guide the web to the other side of the cylinder.

29. In a printing plant, the combination of a plurality of web printing machines or decks, a gathering device, a plurality of devices for receiving sheets arranged adjacent to the path of travel of the gathering device, means for feeding inserts or onserts one at a time toward the gathering device, and means whereby said inserts or onserts can be fed to either side of a receiving device, receiving a web from either one of said machines or decks and associated with signatures produced thereon before being delivered to the gathering device.

30. In a printing plant, the combination with means for feeding a plurality of narrow webs in registration with each other, a movable gathering device, a plurality of collecting, cutting and folding devices arranged along the surface of said gathering device, means for feeding said webs to one or more of said collecting, cutting and folding devices to produce sheets or signatures, means whereby the gathering device gathers the sheets or signatures from all of said folding devices, means for feeding an insert or onsert toward the gathering device, and means whereby said insert or onsert can be fed to either side of one of said feeding devices, whereby either an insert or onsert can be introduced.

31. In a printing plant, the combination of a plurality of web printing machines or decks, a slitting device for each one, means for collating the webs into which the products of each printing machine or deck are slit, a gathering device, a plurality of collecting devices arranged adjacent to the path of travel of the gathering device, means located between said printing machines or decks for feeding inserts one at a time toward the gathering device, and means whereby said inserts can be fed to a collecting device receiving a web from either one of said presses or decks and associated with signatures produced thereon before being delivered to the gathering device.

32. In a printing plant, the combination with a printing press adapted to deliver a small number of products at each revolution, a gathering device, and means for cutting and folding said products to form signatures and delivering them to the gathering device, of a press constructed and adapted to produce a large number of products at each revolution, means for slitting the products of the last named press, means for collating the narrow webs produced thereby, means for cutting the said narrow webs to form sheets, and means for delivering sheets from all of said narrow webs to the gathering device one at a time.

33. In a printing plant, the combination of a fast running web press, a gathering device, and means for feeding the web printed on said press, cutting it into sheets and delivering it to the gathering device in the form of signatures, with a second press adapted to run at a slower speed than the first press and to produce a plurality of duplicate products at each revolution, means for cutting up said products into sheets, and means for delivering them one by one to the gathering mechanism alternately with the entire product delivered thereto by the first named press, whereby the gathering mechanism will be supplied with one of said sheets for each of said products.

34. The combination with a web press having around its circumference a plurality of dissimilar plates adapted to print different pages on the web, a gathering device, and means for cutting up the web, folding it, and applying it to the gathering device in the form of a succession of signatures, of an insert press having a printing cylinder provided with a plurality of duplicate printing plates around its circumference, whereby it will print on the web a plurality of duplicate impressions for each revolution, means for cutting up the product of the insert press into sheets, and means for delivering them to the gathering device in succession one for each of the products of one cycle of operations of said web press.

35. In a printing plant, the combination of a plurality of web printing presses or decks, each having a printing cylinder provided with a plurality of dissimilar plates around its circumference adapted to print the several pages of a complete signature during each rotation of the cylinder, a gathering device, means for cutting up each of the products of said presses or decks, collecting and folding the same to form signatures, and for transferring them to the gathering device in order, with an insert press having a plate cylinder provided with a plurality of duplicate plates arranged around the circumference, whereby at each rotation a plurality of duplicate impressions are obtained on the web in succession, means for cutting up the last named web into sheets or signatures, and for delivering said sheets or signatures one at a time to the gathering device one for each complete product delivered from one of the first named presses.

36. The combination with a web press comprising a cylinder having around its circumference and along the same a plurality of dissimilar plates adapted to print different pages of the same signature on the web, a gathering device, and means for cutting up the web, folding it, and applying it to the gathering device at a plurality of points in the form of a succession of signatures, of an insert press having a printing cylinder provided with a plurality of duplicate printing plates around its circumference and along the same, whereby it will print on the web a plurality of duplicate impressions for each revolution, means for cutting up the product of the insert press longitudinally and laterally into sheets and means for delivering them to the gathering device in succession one for ecah of said signatures.

37. In a printing plant, the combination of a plurality of web printing presses or decks, a gathering device, and means for cutting, folding and delivering the webs from the several decks or presses in the form of signatures to the gathering device at different points therealong, with an insert printing press having means for printing a larger number of complete products at each revolution than are produced by said web presses or decks, and means for delivering one of the products of the insert press to the gathering device between the points at which the signatures of two of said presses or decks are delivered thereto.

38. In a printing plant, the combination of a plurality of printing presses or decks, a gathering device adapted to travel in a path, and a plurality of means arranged along the path of travel of the gathering device for taking the products of said presses and delivering them in the form of signatures to said gathering device, with an insert web printing press having a plate cylinder constructed and adapted to produce a plurality of duplicate products on the web for each revolution of the cylinder, means for cutting up said products into sheets, and means for delivering said sheets one at a time to the gathering device between two of said means for delivering the products of the first named presses to the gathering devices.

39. In a printing plant, the combination of a gathering device adapted to travel in a path, and a plurality of means arranged along the path of travel of the gathering device for delivering signatures to said gathering device, with an insert web printing press having a plate cylinder constructed and adapted to produce a plurality of duplicate products on the web for each revolution of the cylinder, means for cutting up said products into sheets, and means for delivering said sheets one at a time to the gathering device between two of said means for delivering the products of the first named presses to the gathering devices.

40. In a printing plant, the combination of a gathering device, and means for cutting, folding and delivering webs in the form of signatures to the gathering device at different points therealong, with an insert printing press having means for printing a number of complete products at each revolution, and means for delivering one of the products of the insert press to the gathering device between the points at which the signatures are delivered thereto.

41. In a printing plant, the combination of a plurality of printing presses or decks, a gathering device, means for delivering the products of said printing presses or decks to the gathering device in the form of signatures at different points along the gathering device, an insert web printing press having means for producing a plurality of duplicate products on the web for each revolution, means for slitting and cutting said web to form separate sheets, and means for delivering one of said sheets to the gathering device between two of said points each time all the products of said printing presses or decks are delivered thereto.

42. In a printing plant, the combination of a plurality of printing presses or decks, a gathering device, means for delivering the products of said printing presses or decks to the gathering device in the form of signatures at different points along the gathering device, an insert web printing press having means for producing a plurality of duplicate products on the web for each revolution, means for slitting and cutting said webs to form separate sheets, both longitudinally and laterally, and means for feeding said separate sheets individually in a single line, one at a time to the gathering device intermediate the points at which signatures are delivered thereto.

43. In a machine of the character described, the combination with a gathering device, a plurality of presses or decks, and means for delivering to the gathering device signatures produced from said presses or decks, of an insert web press having a plate cylinder provided with a plurality of duplicate plates both circumferentially and longitudinally, whereby at each revolution said insert press will print on the web both laterally and longitudinally, a plurality of duplicate impressions, means for slitting the web to form a plurality of narrow webs, each having a succession of duplicate impressions thereon, means for cutting each of said narrow webs into sheets of one impression each, and means for feeding said sheets in a single line one at a time to the gathering device.

44. In a machine of the character described, the combination with a cylinder web press having a cylinder provided both circumferentially and longitudinally with a plurality of duplicate plates or printing members, whereby the web is printed at each revolution with a plurality of duplicate impressions both longitudinally and laterally, means for slitting the web between the longitudinal lines of impressions to form a plurality of narrower webs, means for cutting the webs between the duplicate impressions thereon to form sheets, a gathering device, and means for feeding all of the sheets one at a time in a single line to said gathering device.

45. In a machine of the character described, the combination with a cylinder web press having a cylinder provided both circumferentially and longitudinally with a plurality of duplicate plates or printing members, whereby the web is printed at each revolution with a plurality of duplicate impressions both longitudinally and laterally, means for slitting the web between the longitudinal lines of impressions to form a plurality of narrower webs, means for cutting each of the narrower webs between the duplicate impressions thereon to form sheets, and means for delivering said sheets from all of the narrower webs one at a time in a single line.

46. In a machine of the character described, the combination with a cylinder web press having a cylinder provided both circumferentially and longitudinally with a plurality of duplicate plates or printing members, whereby the web is printed at each revolution with a plurality of duplicate impressions both longitudinally and laterally, of means for distributing all of said impressions in a single line.

47. In a machine of the character described, the combination with a cylinder web press having a cylinder provided longitudinally with a plurality of duplicate plates or printing members, whereby the web is printed at each revolution with a plurality of duplicate impressions laterally, of means for distributing all of said impressions in a single line.

48. In a machine of the character described, the combination with a plurality of printing presses or decks, of slitting devices for slitting the products thereof into a plurality of webs, means for cross associating a plurality of said webs, of means for taking said webs, cutting them, and delivering them at a plurality of points, of a press having means for producing at each revolution a plurality of duplicate products, means for feeding said products, means for separating them, and means for feeding one of said separated products and associating it with each completed product.

49. In a machine of the character described, the combination with a plurality of printing presses or decks, of slitting devices for slitting the products thereof into a plurality of webs, means for cross-associating a plurality of said webs, a gathering device, and a plurality of means arranged along the surface of the gathering device for taking said webs, cutting them, and delivering them to the gathering device at a plurality of points thereon, of a press having means for producing at each revolution a plurality of duplicate products, means for feeding said products toward the gathering device, means for separating them, and means for feeding one of said separated products to the gathering device every time a completed product of all of said first named presses or decks is fed to the gathering device.

50. In a machine of the character described, the combination with a plurality of printing presses or decks, a gathering device, and means for feeding the products of said presses or decks to the gathering device, of an insert press constructed and adapted to produce a plurality of duplicate products at each revolution, means for slitting the web from said insert press to form a plurality of narrow webs, means for cross-associating said narrow webs, means for cutting up each of said narrow webs into sheets, means for receiving one sheet from each of said narrow webs and for transferring said sheets one at a time to the gathering device.

51. In a machine of the character described, the combination with a plurality of printing presses or decks, a gathering device, and means for feeding the products of said presses or decks to the gathering device, of an insert press constructed and adapted to produce a plurality of duplicate products at each revolution, means for slitting the web from said insert press to form a plurality of narrow webs, means for cross-associating said narrow webs, means for cutting up each of said narrow webs into sheets, and a rotary cylinder for receiving one sheet from each of said narrow webs and for transferring said sheets one at a time to the gathering device.

52. In a machine of the character described, the combination with a plurality of printing presses or decks, of slitting devices for slitting the products thereof into a plurality of webs, means for cross-associating a plurality of said webs, a rotary gathering drum, and a plurality of means arranged at intervals along the surface of the rotary gathering drum for taking said webs, cutting them into sheets, and delivering them to the gathering drum at a plurality of points thereon.

53. In a machine of the character described, the combination with a plurality of printing presses or decks, of slitting devices for slitting the products thereof into a plurality of webs, means for cross associating a plurality of said webs, a rotary gathering drum, and a plurality of means arranged along the surface of the rotary gathering drum for taking said webs, cutting them into sheets, and delivering them to the gathering drum at a plurality of points thereon, said gathering drum being provided with means carried thereon for receiving a sheet or signature from each of the last named means, and for holding them thereon while the drum rotates.

54. In a machine of the character described, the combination with a rotary drum having a plurality of means mounted thereon and spaced around the circumference thereof for receiving sheets or signatures and holding the same on the drum while it rotates, means for supplying sheets or signatures to the drum simultaneously at a plurality of points around its circumference, and means for successively operating the means on the drum to take the sheets and signatures thereon.

55. In a machine of the character described, the combination of a rotary gathering drum, a cam, a plurality of swinging arms mounted on the drum, a pin on each arm, means adapted to engage the cam when the drum is moved into certain positions, whereby said arms will be moved so as to operate said pins, and means for supplying signatures or sheets to the drum simultaneously at a plurality of points in position for each one of them to be engaged by certain of said pins.

56. In a device of the character described, the combination of an endless gathering device movable in an endless path, a plurality of means arranged along the surface of said device for holding sheets or signatures, a plurality of means arranged adjacent to the path of travel for simultaneously delivering sheets or signatures to the gathering device, and means for receiving the sheets or signatures from said device one at a time as the gathering device moves in its path.

57. In a machine of the character described, the combination with a plurality of printing presses, or decks, of slitting devices for slitting the products thereof into a plurality of webs, means for cross associating a plurality of said webs, a traveling gathering device, a plurality of means arranged along the surface of the gathering device, for taking said webs, cutting them into sheets, and delivering them to the gathering device at a plurality of points thereon, and a single delivery device for successively removing the signatures or sheets from the gathering device as the same rotates.

58. In a machine of the character described, the combination with a gathering device adapted to gather a plurality of sheets or signatures on its surface, a delivery mechanism, and means for moving said gathering device to bring the sheets and signatures thereon successively into engagement with the delivery device, said delivery mechanism comprising a delivery cylinder and stripper for removing the sheets and signatures from the gathering device, and a traveling conveyer movable downwardly from the delivery side of said cylinder and having upwardly turned hooks thereon for receiving the sheets and signatures.

59. In a machine of the character described, the combination with a gathering device adapted to gather a plurality of sheets or signatures on its surface, a delivery mechanism, and means for moving said gathering device to bring the sheets and signatures thereon successively into engagement with the delivery device, said delivery mechanism comprising a delivery cylinder and stripper for removing the sheets and signatures from the gathering device, and a traveling conveyer movable downwardly from the delivery side of said cylinder and having upwardly turned hooks thereon for receiving the sheets and signatures, and a collating box having a bottom past which said conveyer is adapted to move, said bottom projecting out into the plane of said hooks, whereby as the hooks descend below the bottom, said bottom will receive and hold the sheets and signatures thereon one at a time.

60. In a printing plant, the combination of a plurality of web printing presses or decks, each having a printing cylinder adapted to print the several pages of a complete signature during each rotation of the cylinder, a gathering device, means for cutting up each of the products of said presses or decks, collecting and folding the same to form signatures, and for transferring them to the gathering device in order, with an insert press, means for cutting up the web into sheets or signatures, and for delivering said sheets or signatures one at a time to the gathering device, one for each complete product delivered from one of the first named presses or decks.

61. In a machine of the character described, the combination with means for feeding a plurality of webs with their central lines substantially in the same plane, of a gathering device having a plurality of means thereon in the same plane for receiving sheets or signatures from the several webs, and means for simultaneously delivering to each of said receiving means a sheet or signature from said webs.

In testimony whereof I have hereunto set my hand, in the presence of two subscribing witnesses.

HENRY A. WISE WOOD.

Witnesses:
WILHELMENA F. RHODE,
MABEL M. GLASSEY.